US010969461B1

(12) United States Patent
O'Neill et al.

(10) Patent No.: US 10,969,461 B1
(45) Date of Patent: Apr. 6, 2021

(54) ELECTROMAGNETIC TRACKING OF MOVEABLE DEVICE WITH ORIENTATION DETERMINATION

(71) Applicant: AMAZON TECHNOLOGIES, INC., Seattle, WA (US)

(72) Inventors: Nathan Pius O'Neill, Snohomish, WA (US); Nikolai Orlov, Seattle, WA (US); Christopher Raymond Grajewski, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/614,223

(22) Filed: Jun. 5, 2017

(51) Int. Cl.
*G06F 11/30* (2006.01)
*G01S 5/02* (2010.01)
*G01B 15/00* (2006.01)
*G06Q 10/08* (2012.01)

(52) U.S. Cl.
CPC ............ *G01S 5/0294* (2013.01); *G01B 15/00* (2013.01); *G01S 5/0226* (2013.01); *G01S 5/0289* (2013.01); *G06Q 10/087* (2013.01)

(58) Field of Classification Search
CPC .................................................... G01S 5/0294
See application file for complete search history.

(56) References Cited

U.S. PATENT DOCUMENTS

| 7,225,980 B2 * | 6/2007 | Ku .......................... G07G 1/009 235/383 |
| 7,949,568 B2 | 5/2011 | Fano et al. |
| 8,009,864 B2 | 8/2011 | Linaker et al. |
| 8,189,855 B2 | 5/2012 | Opalach et al. |
| 8,630,924 B2 | 1/2014 | Groenevelt et al. |
| 9,235,928 B2 | 1/2016 | Medioni et al. |
| 9,473,747 B2 | 10/2016 | Kobres et al. |
| 2011/0011936 A1 | 1/2011 | Morandi et al. |

(Continued)

OTHER PUBLICATIONS

Asthana, et al., "An indoor wireless system for personalized shopping assistance"; CiteSeerX, In proceedingsof IEEE Workshop on Mobile Computing Systems and Application, 1994; [retrieved on Jun. 3, 2013], Retrieved from Internet:<URL:http//citeseerx.ist.psu.edu/viewdoc/summary?doi=10.1.1.127.3033> (Year: 1994).*

(Continued)

*Primary Examiner* — Phuong Huynh
(74) *Attorney, Agent, or Firm* — Lindauer Law, PLLC

(57) ABSTRACT

A facility is equipped with a floor containing one or more of a transmitter to generate electromagnetic signals (EMS) or a receiver to receive EMS. A device such as a tote may include one or more of a transmitters to generate EMS that may then be received by the receiver in the floor or a receiver to receive EMS transmitted by the floor. As the tote moves across the floor, tracking data may be generated using the information obtained from the exchange of EMS. Orientation of the tote with respect to the floor may be determined using an asymmetric arrangement of antennas on the tote, by encoding data within the EMS, or a combination thereof. For example, the tote may include three antennas arranged in a triangular layout, or a front antenna and a back antenna each used to transmit an EMS that is indicative of relative placement of the tote.

20 Claims, 17 Drawing Sheets

(56) References Cited

U.S. PATENT DOCUMENTS

2012/0284132 A1* 11/2012 Kim .................. G07G 1/0081
705/20
2013/0284806 A1   10/2013 Margalit
2015/0086107 A1    3/2015 Dedeoglu et al.

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <<URL: http://citeseerx.ist.psu.edu/viewdoc/summary?doi=10.1.1.127.3033>.
Dietz, et al., "DiamondTouch: A Multi-User Touch Technology", Mitsubishi Electric Research Laboratories. TR2003-125. Oct. 2003. Retrieved from the Internet: <<URL: http://www.merl.com/publications/docs/TR2003-125.pdf>>.
Fischer, Dirk, "Capacitive Touch Sensors. Application Fields, technology overview and implementation example", Fujitsu Microelectronics Europe GmbH. V4, Jan. 12, 2010. Retrieved from the Internet: <<URL: http://www.fujitsu.com/downloads/MICRO/fme/articles/fujitsu-whitepaper-capacitive-touch-sensors.pdf>>.
Hasegawa, et al., "Human Body Equivalent Phantom for Analyzing of Surface and Space Propagation in MHz-Band Signal Transmission", Department of Electronics, Kyoto Institute of Technology. Retrieved from the Internet: <<URL: http://ieeexplore.ieee.org/document/7481823/>>.
Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from the Internet: <<URL: http://www.researchgate.net/publication/221568350_How_to_nudge_in_Situ_designing_lambent_devices_to_deliver_salient_information_in_supermarkets>>.
O'Connor, Todd, "mTouch™ Projected Capacitive Touch Screen Sensing Theory of Operation", Microchip Technology Inc. TB3064. 2010. Retrieved from the Internet: <<URL: https://www.microchip.com/stellent/groups/techpub_sg/documents/devicedoc/en550192.pdf>>.
Pop, Cristian, "Introduction to the BodyCom Technology", AN1391, DS01391A, Microchip Technology, Inc., May 2, 2011.
Valtonen, Miika, "Technologies for Smart Environments: Capacitive User Tracking and Proactive Fuzzy Control", Tampere University of Technology. Publication 1044. 2012. Retrieved from the Internet: <<URL: http://dspace.cc.tut.fi/dpub/bitstream/handle/123456789/21002/valtonen.pdf?sequence=3&isAllowed=y>>.
Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

ELECTROMAGNETIC TRACKING OF MOVEABLE DEVICE WITH ORIENTATION DETERMINATION

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity or movement of users, inventory, or other objects within the facility.

Other types of facilities may also benefit from tracking of users or other objects. For example, hospitals may wish to track the location of moveable beds, airports may wish to track the location of service carts, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
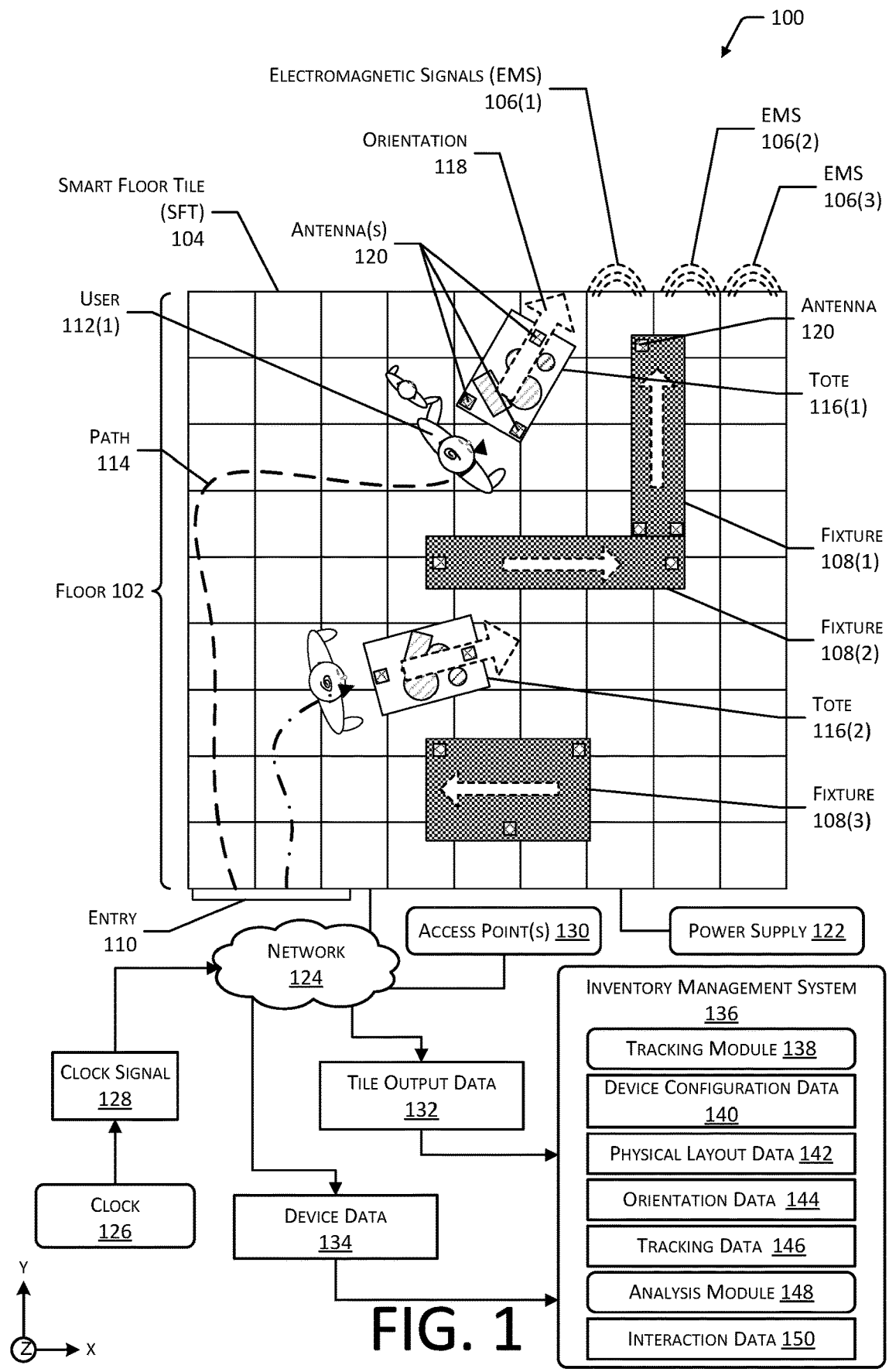
FIG. 1 illustrates a system using electromagnetic signals to generate tracking data about location and orientation of objects, such as users or totes, within a facility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Described in this disclosure are systems and techniques for determining an orientation of a device located in a materials handling facility (facility). The facility may include, or have access to, an inventory management system. The inventory management system may be configured to maintain information about items, users, condition of the facility, and so forth. For example, the inventory management system may maintain data indicative of a number of items at a particular fixture, what items a particular user is ordered to pick, how many items have been picked or placed at the fixture, requests for assistance, environmental status of the facility, location of a device, orientation of a device, and so forth.

Operation of the facility may be facilitated by using one or more sensors to acquire information about interactions in the facility. The inventory management system may process the sensor data from the one or more sensors to determine orientation data, tracking data, interaction data, and so forth. The orientation data provides information indicative of an orientation of a device. The orientation may be with respect to an internal or external reference system. For example, the orientation may be "pointed at a shelf" or may be "pointed northwest". The tracking data provides information about one or more of the location of a user within the facility, their path through the facility, and so forth. The interaction data is indicative of an action such as picking or placing an item at a particular location on the fixture, touching an item at a particular location on the fixture, presence of the user at the fixture without touching the item, and so forth. For example, the inventory management system may use the sensor data to generate interaction data that indicates a type of item a user picked from a particular fixture.

The facility may include different kinds of moveable devices. For example, the moveable devices may include carts, totes, fixtures, tools, robots, pallets, and so forth.

A fixture may include one or more item stowage areas such as shelves, hangers, bins, baskets, counters, and so forth, that hold or otherwise support a type of item. The fixture may be arranged into sections, such as lanes on a shelf. For example, a shelf may have three lanes, with each lane holding a different type of item. Items may be added to (placed) or removed (picked) from the fixture, moved from one fixture to another, and so forth.

The floor of the facility may comprise a plurality of smart floor tiles. The smart floor tiles may include transmitters that generate electromagnetic signals (EMS) and one or more receivers that detects the EMS. For example, the carrier of these signals may be less than or equal to 30 MHz. The smart floor tiles may also include sensors such as touch or pressure sensors that provide data indicative of an object such as a foot or wheel that is in contact with the smart floor tile.

Smart floor tiles may be arranged in clusters to form larger areas of floor. Each smart floor tile, in turn, has a plurality of segments. One or more transmitters of the smart floor tile are configured to transmit EMSs. In one implementation, the same frequency may be used by all of the smart floor tiles in the facility. In another implementation, different frequencies may be used by different segments, smart floor tiles, or clusters. Objects may be equipped with one or more transmitters or receivers. For example, an object may have a transmitter that generates an EMS at a frequency different from that used by the smart floor.

In one implementation that utilizes time division multiple access (TDMA), EMS radiated from a particular segment are scheduled to occur during a particular timeslot. Each segment signal within a given smart floor tile is transmitted during a different timeslot, or interval of time. Each segment includes at least one antenna that radiates the segment signal assigned to that segment during the timeslot. In some implementations, an initial signal may be transmitted using all of the antennas in the smart floor tile or across a cluster of smart floor tiles, prior to the transmission of the segment signals. The initial signal may operate as a preamble, providing a reference against which timing may be synchronized to determine what timeslot a particular segment signal is associated with. In some implementations, the initial signal may also be used to minimize a receiver sampling noise. For example, the initial signal may break a squelch.

In another implementation that uses code division multiple access (CDMA), each segment may transmit a segment signal that is modulated to include a CDMA code. The CDMA code is thus used to identify a particular segment in the smart floor tile, while the frequency of the signal is used to determine the particular smart floor tile within a cluster. In this implementation, the segment signals may be transmitted at the same time from their respective segments and the segment antennas therein.

An object, or portion thereof, may electromagnetically couple to a proximate antenna in the smart floor tile. For example, when a user is standing with their left foot on a first segment in a first smart floor tile, their left foot electromagnetically couples to the antenna in that segment. As a result of this coupling, a first set of the signals transmitted by the first segment are transferred along the body of the user by way of this electromagnetic coupling. Continuing the example, the signals are propagated along the body of the user standing on that segment to the other extremities such as the right foot and both hands. Other objects may exhibit the same propagation of signals. For example, a first set of signals transmitted by the first segment may be transferred along the structure of the tote to a second segment.

As an object moves, the object acts as a bridge which may propagate the signals from one segment to another. For example, as the user walks, their right foot comes to rest on a second smart floor tile. The body of the user now acts as a bridge, providing a signal path along which signals may travel between the first and second smart floor tiles. A receiver in the second smart floor tile detects the first set of signals that originated by the first smart floor tile under the left foot. Meanwhile, the reverse happens with the first smart floor tile detecting a second set of signals that originate from the second smart floor tile and are passed from the right foot through the user's body to the left foot.

Some objects in the facility may be fixed, such as shelving gondolas that are bolted to the floor. Other objects in the facility may be moveable, such that their relative location within the facility may change over time. For example, a tote may be moved from one location to another when pushed by a user, a robot may move from one location to another, a shelf may be relocated to another location in the facility, and so forth. The orientation of these objects may be useful in the operation of the inventory management system or other systems. For example, information about the orientation of a tote may be useful to predict what direction a user of the tote will move to next. In another example, orientation of a shelf may be useful to help disambiguate whether the user is in front of the shelf, and potentially picking or placing items therefrom, or behind the shelf in which case they are unable to pick or place items.

As described in this disclosure, the orientation of devices may be determined using information obtained using one or more of transmitters or receivers on the device. In one implementation, a device may have a plurality of antennas that are used to radiate or receive an EMS. For example, three antennas may be mounted to a structure of the device in an arrangement that produces an asymmetrical pattern within a plane that is parallel to the floor. For example, the asymmetrical pattern may be asymmetrical within the plane along at least one axis. Continuing the example, three antennas may be emplaced at the vertices of an isosceles triangle, at the ends and vertex of an "L" shape, and so forth. The antennas of the device may radiate the EMS, that is detected by the segments of the smart floor tiles. The smart floor tiles may produce tile output data that is indicative of the signal being received at one or more segments, amplitude of the received signal, and so forth. The relative location of each segment in the smart floor with respect to other segments or to a reference point is known. The tile output data may be processed to determine the location of each antenna, and these locations may then be compared to device configuration data that indicates the known arrangements of antennas for particular devices or types of devices.

Continuing the example above, if the triangular arrangement indicated by the device configuration data is within a threshold tolerance of matching the locations of EMS determined from the tile output data, presence of the device may be determined. Furthermore, due to the asymmetric pattern of the antenna arrangement, the orientation of the device may be determined. As a result, one or more of the presence of a particular device or type of device, location, or orientation may be determined.

In other implementations other techniques may be used. For example, a plurality of antennas on the device may be used to receive signals produced by the segments. Information about the signal as received may be used to produce device data. The device configuration data may indicate the known arrangement of the antennas for the device. The device configuration data and the device data may then be used by a computing device to determine one or more of an orientation or location of the device with respect to the floor.

In still other implementations other techniques or combinations thereof may be used as well. For example, the device may radiate a specific signal from a particular antenna, such that a first signal from a first antenna at the front of the device may be distinguished from a second signal from a second antenna at the back of the device. In another example, device data may be generated that indicates a first signal was received from the smart floor at a first antenna having a known position on the device and that a second signal was received from the smart floor at a second antenna having a known position on the device.

The smart floor tiles may generate information indicative of a shape of an object that is above. For example, data from the smart floor tiles may be used to determine the shape of an asymmetrical antenna affixed to, or integral with, the device. Based on the asymmetry of the shape, the orientation of the device may be determined.

The smart floor tiles may generate tile output data that includes received characteristic data. The received characteristic data provides information about the signals received and may include the received signal strength of those signals. The tile output data from the first and second smart floor tiles may be used to determine that the user is in contact with both tiles. For example, a server may receive the tile output data and determine that these two smart floor tiles and their respective segments are reporting received characteristic data indicative of the other smart floor tile. Given this correspondence, the two locations of the received characteristic data may be associated with a single device, such as the feet of a single user or the antennas of a tote, and a location of the user may be determined. The server may also analyze the received characteristic data obtained from several segments and estimate a shape of a device, such as the shape of an antenna, a user's foot, and so forth.

By determining a successive series of locations of the device over time, tracking data may be generated. The tracking data comprises information indicative of the user's path through the facility. As described above, the orientation data described above may be obtained using information about the physical layout of the facility indicative of placement of the smart floor tiles and their respective segments, and one or more of the tile output data or device data. The orientation data provides an indication of what direction the object is pointed, facing, and so forth. For example, the orientation data may be indicative of a bearing of a line pointing from a back of a device to a front. The bearing may be expressed with respect to a reference that is external to the device, such as geographic north, with respect to a facility specific coordinate system, and so forth.

By using the techniques described herein, operation of the facility may be improved. Details about movement of the devices in the facility, the interactions between devices and items in the facility, and so forth, may be quickly and accurately determined. For example, as items are picked, placed, and so forth, information such as inventory levels based on changes in the count of items at the fixtures may be readily and more accurately determined. Orientation data of a device such as a tote may be used to disambiguate interactions between users who are near one another, determine those inventory locations that are near the user for which an interaction is possible or impossible, and so forth. As a result, the inventory management system may be able to quickly track what item a user has interacted with, maintain up-to-date inventory information, and so forth. Tracking of devices may be facilitated, allowing for enhanced services to the users of the facility, such as making the facility respond to the presence of a user. For example, as the tote of an authorized user is turned towards a fixture holding items that is locked, the fixture may unlock to provide access.

The smart floor tiles provide various technical advantages including, but not limited to, reductions in bandwidth compared to other sensor methodologies, improved tracking of individual devices in congested environments, detection of potential hazards, detection of user incapacity, and so forth. The smart floor tiles are mechanically robust and provide high resolution tracking data for devices as well as providing the ability to identify an object such as a user or robot that is interacting with a particular fixture, item, and so forth. The system described herein allows for reduced capital expenditures, as well as reduced operating expenditures relative to other sensor methodologies. For example, compared to vision tracking systems, installation of smart floor tiles is less expensive and, during operation, requires fewer computational resources, is less prone to failure or environmental interference, and so forth. The smart floor tiles and the information obtained thereby may be used in conjunction with other systems, such as vision tracking systems, tag tracking systems, and so forth.

The system described herein may be used in other types of facilities, both commercial and non-commercial. For example, the smart floor tiles may be installed within a home or care facility and provide information such as device tracking indicating the location and orientation of a gurney, wheelchair, and so forth. The system may also provide enhanced functionality, such as adjusting building operation based on the data obtained. For example, by tracking the device in the facility, lighting, environmental controls, and so forth, may be controlled based on the location of the device.

Illustrative System

FIG. 1 illustrates a system 100 using a variety of sensors to generate data such as orientation data, tracking data and so forth about objects within a facility, according to some implementations. The facility includes a floor 102. The floor 102 may comprise a plurality of smart floor tiles (SFTs) 104. A group of the SFTs 104 forms a cluster. The floor 102 may include a plurality of clusters.

Each of the SFTs 104 may include various components such as antennas, transmitters, receivers, hardware processors, sensors, and so forth. The SFT 104 may itself be subdivided into segments. For example, each segment may comprise a different antenna. The SFT 104 may be configured to transmit and receive electromagnetic signals (EMS)

106. The EMS 106 may be transmitted at a low power. For example, the EMS 106 may have a power level of less than 500 microwatts.

These EMS 106 may be propagated by an object, such as the body of a user. For example, the EMS 106 may be propagated along the skin or clothing of the user, travelling from one SFT 104 to another, or from one SFT 104 to another device such as the fixtures 108. The EMS 106 transmissions may be radiated using one or more of the antennas of the SFT 104. The different types of signals that may be transmitted are discussed in more detail below with regard to at least FIGS. 2 and 5. The SFT 104 is discussed in more detail below with regard to FIG. 3.

Within the facility may be one or more fixtures 108. The fixture 108 may include shelves, hangers, and so forth, that hold or otherwise support a type of item. The fixture 108 may be arranged into sections, such as lanes on a shelf. For example, a shelf may have three lanes, with each lane holding a different type of item. Items may be added to (placed) or removed (picked) from the fixture 108, moved from one fixture 108 to another, and so forth. In some implementations, the SFTs 104 may be installed, and devices such as the fixtures 108 or other objects may then be installed atop the SFTs 104. The fixtures 108 may be moveable. For example, a fixture 108 such as an item display or presentation counter may be moveable from one location to another in the facility. In other implementations, the fixtures 108 may be installed and then the SFTs 104 may be installed around the fixtures 108. Some portions of the floor 102 may omit SFTs 104. For example, SFTs 104 may be omitted from around the perimeter of a room, immediately adjacent to a wall, underneath a fixture 108, and so forth.

An entry 110 provides access for a user 112 to the facility. For example, the entry 110 may comprise a foyer, door, gated entry area, and so forth. In some implementations, an identity of the user 112 may be asserted at the entry 110 or thereafter. For example, the user 112 may provide identification credentials such as swiping a card, carrying a device that transmits or displays authentication credentials, and so forth. The user 112 may move throughout the facility, with movement depicted in this illustration as a user path 114 across the floor 102. The user 112 may use various devices while in the facility, such as a tote 116, pallet jack, forklift, tool, and so forth. The tote 116 may include a basket, cart, bin, bag, and so forth. During operation of the facility, users 112 thus move around, picking, placing, or otherwise interacting with items at the fixtures 108.

Devices such as the fixtures 108, totes 116, and so forth may be configured to facilitate one or more of tracking or orientation determination. Orientation 118 of a device is indicative of what direction the device is pointed, facing, and so forth. For example, the orientation data may be indicative of a bearing of a line pointing from a back of a device to a front. The bearing may be expressed with respect to a reference that is external to the device, such as geographic north, with respect to a facility specific coordinate system, and so forth.

To facilitate the determination of the orientation 118, devices such as the totes 116, the fixtures 108, and so forth may include one or more antennas 120. These one or more antennas 120 are configured to electromagnetically couple to antennas within the SFTs 104. For example, the antennas 120 may capacitively couple to one or more of the antennas within the SFT 104 below. The antennas 120 may be mounted proximate to the floor 102. For example, the antennas 120 may be affixed to the underside of a structure of the device. In implementations where multiple antennas 120 are present in a single device, the antennas 120 may be emplaced in an arrangement that produces an asymmetrical pattern within a plane that is parallel to the floor. For example, the pattern may be asymmetrical about at least one axis. By using data indicative of the placement of the antennas 120 of the device with respect to the SFTs 104 in the floor 102, as described below, various data may be produced.

The SFTs 104 may obtain electrical power from a power supply 122. For example, the power supply 122 may provide 24 volts direct current (VDC) to one or more of the SFTs 104. The power supply 122 may be configured to obtain power from building electrical mains and then provide conditioned power for use. The SFTs 104 are connected to a network 124. The network 124 allows for communication between SFTs 104 and other devices, such as described below.

A clock 126 may provide a clock signal 128 or other clock data that is transmitted to the SFTs 104 using the network 124. In some implementations, the clock signal 128 may be distributed via another mechanism, such as by the power supply 122 by way of a power distribution network, via wireless transmission, optically, and so forth. For example, the clock signal 128 may be overlaid as an alternating current signal along one or more of the electrical conductors used to supply direct current power to the SFTs 104. In some implementations, the clock signal 128 may be omitted, with each SFT 104 operating with independent clocks 126 or "free running".

One or more access points 130 or other devices may be connected to the network 124. The network 124 may comprise a local area network, wide area network, and so forth. The access points 130 allow devices such as totes 116, fixtures 108, and so forth, to connect wirelessly to the network 124. For example, the access points 130 may utilize optical transmission, radio frequency transmission, acoustic transmission, magnetic transmission, and so forth to communicate with a communication interface of a device.

One or more processors of the SFTs 104 may generate tile output data 132. The tile output data 132 may be indicative of reception of a signal. For example, the tile output data may be indicative of data that is conveyed by the signal, such as a tote identifier. In another example, the tile output data may be indicative of a signal being received and information such as a received signal strength. The tile output data 132 may include characteristic data. The characteristic data may be indicative of the EMS 106 received, the received signal strength of the signals, and so forth. In some implementations, the characteristic data may include information such as a timestamp associated with the EMS 106. The characteristic data is indicative of a particular SFT 104 and one or more segments of the SFT 104. The tile output data 132 may include information about the SFT 104 itself and the segments thereon that received the signals that are represented by the characteristic data. For example, the tile output data 132 may comprise characteristic data for the EMS 106 received at each segment.

During operation, a first foot of the user 112 is in contact with a first SFT 104(1). The particular EMS 106(1) transmitted by the first SFT 104(1) is electromagnetically coupled to the body of the user 112 and transferred along a signal path that includes the body of the user 112 from the first foot to the second foot of the user 112. As the second foot of the user 112 comes into contact with a second SFT 104(2), a receiver in the second SFT 104(2) receives the particular EMS 106(1) as propagated along the body of the user 112 from the first SFT 104(1) to the second SFT 104(2).

At the same or a different time, the reverse may take place, with the first SFT 104(1) receiving an EMS 106(2) transmitted by the second SFT 104(2).

As the user 112 walks across the floor 102, they act as a bridge between successive SFTs 104, resulting in a trail of pairs of SFTs 104 (or the segments therein) that have been trod upon. Tile output data 132 may be generated that is indicative of the identity of the receiving SFT 104 and the characteristic data indicative of the EMS 106 that were received. The tile output data 132 may be transferred from the SFT 104 in the floor 102 to an inventory management system 136 via the network 124. Other information, such as the device data 134, may also be provided to the inventory management system 136.

Devices such as the totes 116 or fixtures 108 may include one or more transmitters used to generate EMS 106 that are radiated by antennas 120 at particular locations on the device. These EMS 106 radiated from the device may be detected by the SFTs 104 and the segments therein. The tile output data 132 may include information indicative of this reception.

The devices may generate device data 134. Devices such as the totes 116 or fixtures 108 may include one or more receivers used to detect EMS 106 that are radiated by the SFT 104 and acquired by antennas 120 at particular locations on the device. The device data 134 may include information indicative of the EMS 106 received, signal strength, particular antenna 120 used to acquire the EMS 106, and so forth. The device data 134 may be transferred from the device via the network 124. For example, the device may use a communication interface to wirelessly transmit data to one or more of the access points 130. In another example the device may use a transmitter to send the device data 134 as an EMS 106 using one or more antennas 120. The EMS 106 conveying the device data 134 may then be received by the SFT 104 and subsequently transferred via the network 124.

The device data 134 may include other information as well, such as a device identifier, device type, data indicative of a user associated with the device, data from one or more sensors, and so forth. The device identifier may identify a particular tote 116 within the facility. The device type may provide information indicative of a particular make, model, or type of device. The data indicative of a user may comprise a user identifier, login credentials, hash of login credentials, and so forth. For example, a user may log into the tote 116 and information indicative of that user may be included in the device data 134. The data from one or more sensors may include one or more of data from a weight sensor, data from a proximity sensor, data obtained by a touch sensor, data obtained by a button, and so forth.

The inventory management system 136 may include a tracking module 138. The tracking module 138 may use one or more of the tile output data 132, the device data 134, device configuration data 140, physical layout data 142, and so forth to generate one or more of orientation data 144, or tracking data 146. For example, the tote 116 may emit EMS 106 which are detected by the SFT 104, with the tile output data 132 used to determine the orientation data 144. In another example, the tote 116 may receive the EMS 106 emitted by the floor and provide device data 134 which may then be used to determine the orientation data 144.

The device configuration data 140 comprises information indicative of a particular device, type of device, and so forth. For example, the device configuration data 140 may comprise information indicative of a particular physical arrangement of the antennas 120 on a particular type of tote 116, particular EMS 106 code data or timeslot, and so forth. The device configuration data 140 may also include data indicative of an orientation of the device with respect to one or more of the antennas 120. For example, that the first antenna 120(1) is at the front while the second antenna 120(2) is at the back.

The physical layout data 142 may provide information indicative of location of the SFTs 104, relative arrangement of SFTs 104 or portions thereof such as segments, dimensional information about SFTs 104, size of fixtures 108, and so forth. For example, the physical layout data 142 may comprise information representative of a map or floor plan of the facility with relative positions of the fixtures 108, location of individual SFTs 104 therein, arrangements of the segments 204, and so forth. Continuing the example, the physical layout data 142 may indicate the particular arrangement of which SFTs 104 are in which particular rows and columns of a grid pattern that describes the floor 102.

The physical layout data 142 may provide information that associates a particular SFT 104 or portion thereof, such as a segment 204 or an antenna 304 associated with that segment 204, with a particular physical location within the facility. In other implementations, the physical layout data 142 may provide information indicative of relative placement within the facility. For example, fixture 108(1) is to the left of fixture 108(2).

The orientation data 144 provides information indicative of an orientation of the device. The orientation may be indicative of a bearing of the device along a specified axis of the device. For example, the orientation data 144 may indicate that a line starting from a particular point at the rear of the device and extending through a particular point at the front of the device is directed along an angle of 325 degrees with respect to an origin defined for the facility. In another example, the orientation data 144 may be categorical, such as indicating "towards a shelf" or "not pointed at a user".

The tracking data 146 may include one or more of information indicative of the user path 114 within the facility, current location, location at a particular time, and so forth. In some implementations, the tracking module 138 may be executed as a tracking system, such as provided by one or more computing devices. In some implementations, the tracking module 138 may use the characteristic data to further distinguish between users 112 or other devices. For example, the user 112, tote 116, or other device may include a transmitter that emits a discrete EMS 106 to a receiver that receives the EMS 106 and provides characteristic data.

An analysis module 148 may use the tracking data 146 to generate group data. The group data may comprise information that associates a plurality of users 112 as belonging to a common group or having a common affiliation. For example, members of a family within the facility may be deemed to be a group, members of the same picking crew may be members of a group, and so forth. In some implementations, the tile output data 132 may be processed to determine the group data. For example, several users 112 may be holding hands or otherwise in physical contact with one another. As a result of this contact, the EMS 106 from a first SFT 104(1) may be transferred through those users 112 to the receivers of the SFTs 104 beneath each of the other members of the group. By determining the presence of a plurality of users 112, such as by multiple footprints detected by the sensors within the SFTs 104 that share a common EMS 106 that encode the same characteristic data, group data may be determined. In another example, the users 112 following behind a tote 116, such as indicated by their tracking data 146 and relative to the orientation data 144 indicating the orientation 118 of the tote 116 may be determined to be members of a group.

The analysis module 148 may also generate interaction data 150. The interaction data 150 is indicative of an action such as picking or placing an item at a particular fixture 108, approaching but not touching an item stowed at the fixture 108, presence of the user 112 at the fixture 108, and so forth. For example, the analysis module 148 may use tracking data 146 to determine that a particular user 112 was in front of a particular fixture 108 at a time when that fixture 108 experienced a change in quantity of items stowed therein. Based on this correspondence, a particular user 112 may be associated with that change in quantity, and interaction data 150 indicative of this may be generated.

The analysis module 148 may also use the device data 134 or other data obtained from one or more sensors or other devices located at or near the device to generate the interaction data 150. For example, the fixture 108 may include one or more receivers that are able to receive the EMS 106. As the user 112 comes in contact with the item stowed at the fixture 108, their body and the item itself provide a pathway for the EMS 106 to be transferred to an antenna 120 located at the fixture 108. As a result, use of the SFT 104 and the EMS 106 provides the additional benefit of unambiguously identifying an item that the particular user 112 interacted with. The analysis module 148 is configured to generate the interaction data 150 based on inputs including, but not limited to, the tile output data 132, the fixture 108, and so forth.

While FIG. 1 depicts the floor 102 as being completely covered with SFTs 104, in some implementations, only a portion of the floor 102 may include SFTs 104. For example, SFTs 104 may be placed within an aisle and not underneath the fixtures 108. In another example, the SFTs 104 may be deployed in front of the fixtures 108.

The inventory management system 136 may access data from other sensors within the facility. For example, image data may be obtained from a plurality of cameras located within the facility. Various image processing techniques may be used, such as object recognition, blob tracking, and so forth, to generate information from this image data. In some implementations, the image data may be processed by human operators. For example, a human operator may be presented with images as well as tracking data 146 to resolve an ambiguity or loss of tracking.

Figure 2:
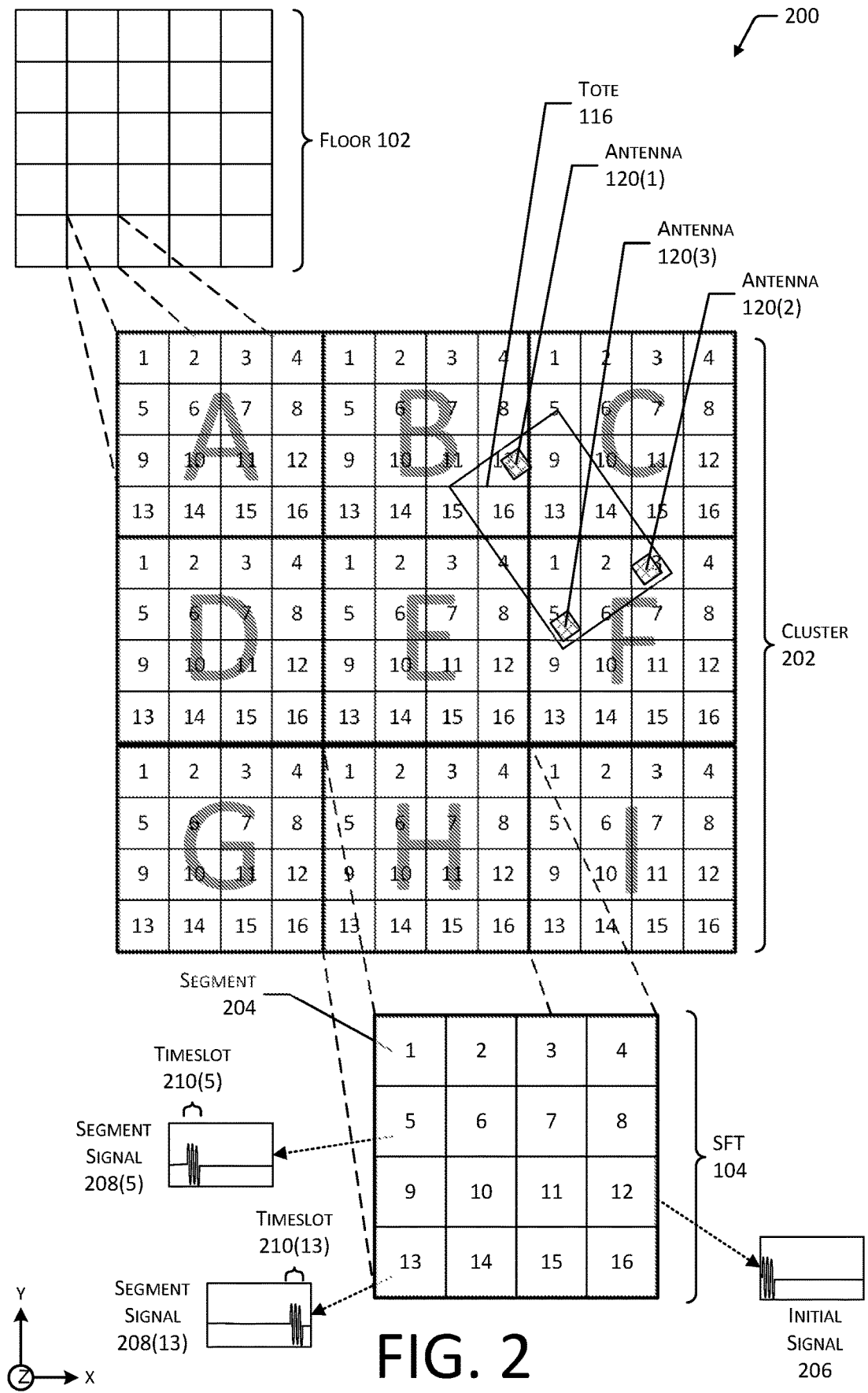
FIG. 2 illustrates an arrangement of smart floors tiles and their respective segments emitting signals at particular timeslots, according to some implementations.

FIG. 2 illustrates an arrangement 200 of SFTs 104 and their respective segments, according to some implementations.

A portion of the floor 102 is depicted which is made up of several clusters 202. A cluster 202 is a grouping of SFTs 104. For example, the portion of the floor 102 depicted here includes 25 clusters 202, each cluster 202 including 16 SFTs 104. Each SFT 104 in turn may include one or more segments 204. Continuing the example depicted here, each SFT 104 includes 16 segments 204. In other implementations, the cluster 202 may include different numbers of SFTs 104, each SFT 104 may include different numbers of segments 204, and so forth.

In some implementations, segments 204 may comprise portions of a SFT 104 or may be discrete devices that are joined together to form a SFT 104. For example, the segments 204 may be connected to one another, a backplane, wiring harness, and so forth, to form a SFT 104. In another example, the SFT 104 may comprise a single segment 204.

The physical size of a cluster 202 may be determined in some implementations based on a maximum expected stride length for a user 112. For example, a user 112 may be expected to have a stride length that is less than 3 feet while walking. If the SFTs 104 are 1 foot on each side, then the cluster 202 depicted here is 3 feet by 3 feet. Likewise, each segment 204 is a 3 by 3 inch square. In other implementations, other sizes of segments 204, SFTs 104, and clusters 202 may be used. Also, other shapes of segments 204, SFTs 104, and clusters 202 may be used. For example, the segments 204 may be triangular shaped, SFTs 104 may be rectangular, and so forth.

The SFT 104 transmits one or more EMS 106. For example, an initial signal 206 and one or more segment signals 208 may be transmitted. Together, these signals comprise the EMS 106 emitted by the SFT 104. The segment signal 208 may be unmodulated, may contain null data, or may encode data. The EMS 106 transmitted by the SFT 104 may be at a first frequency. The segment signal 208 may also be transmitted at the first frequency, and includes a signal that is transmitted at a particular time within a timeslot 210. The timeslot 210, in turn, is associated with the particular segment 204 within a particular SFT 104. For example, a segment signal 208 received during a particular timeslot 210 may be deemed to be associated with the segment 204 assigned to that timeslot. In some implementations, the occurrence of the segment signal 208 at a particular time within a timeslot 210 is thus representative of the particular timeslot 210, and the corresponding segment 204 associated with that timeslot 210. In some implementations, the timeslot 210 may be 1 millisecond (ms) or less in duration. The characteristic data may include timestamp data associated with receipt of one or more of the initial signal 206 or the segment signal 208. In some implementations, the timestamp data may be used to determine the timeslot 210.

In this figure, the SFT 104 is represented by a letter, such as "A", "B", "C", and so forth, while each segment 204 with a corresponding timeslot 210 is represented by a number "1", "2", "3", and so forth. For example, the segment signals 208 may be configured such that the first timeslot 210(1) is associated with segment 204(1), a second timeslot 210(2) is associated with a segment 204(2), and so forth. In one implementation, each timeslot 210 may be less than or equal to 1 ms in duration. The notation, frequencies, and timeslot size are provided by way of illustration and not necessarily as limitations. In some implementations, the duration of timeslots 210 may differ. For example, timeslot 210(1) may be 5 ms in duration while timeslot 210(2) is 1 ms in duration.

The EMS 106 as emitted may exhibit sinusoidal waveforms. In other implementations, other waveforms such as square, triangle, sawtooth, and so forth, may be used. Use of sinusoidal waveforms may allow for reduced channel spacing and minimize adjacent channel interference in situations where several frequencies are utilized at the same time. The EMS 106 may be transmitted at fixed carrier frequencies of between 20 kHz and 30 MHz. In other implementations, other frequencies may be used. In some implementations, the waveforms of the initial signal 206 may differ from the waveforms of the segment signal 208.

In some implementations, as depicted here, each SFT 104 may utilize the same spatial arrangement of segments 204, segment number scheme, and corresponding timeslot 210 associated with that segment 204. For example, the SFTs 104 in the floor 102 may have the same arrangement of segments 204, such as beginning at the top left of the SFT 104 with segment 1 and increasing from left to right and into subsequent rows, such as in SFT 104(A).

In this illustration, a tote 116 is depicted. Users 112 are omitted for clarity, and not as a limitation. The tote 116 includes three antennas 120 in an asymmetric arrangement.

A first antenna 120(1) is proximate to SFT 104(B)(12), a second antenna 120(2) is proximate to SFT 104(F)(3), and a third antenna 120(3) is proximate to SFT 104(F)(5). The antennas 120 of the tote 116 may capacitively couple to antennas within the SFTs 104 proximate to them.

The SFTs 104 may be configurable, such that they may be installed and then configured to transmit at a particular frequency after physical installation of the SFT 104. For example, SFT 104(A) may be electronically switched to generate EMS 106 at a specified frequency.

The SFTs 104 may be installed inside or outside of a building. For example, the floor 102 of an uncovered area, yard, exterior shed, and so forth may be equipped with the SFTs 104.

While the hierarchy of floor 102, cluster 202, SFT 104 and segments 204 is discussed and used herein, it is understood that other hierarchies or arrangements may utilize the techniques described herein. For example, instead of segments 204 being part of an SFT 104, the floor 102 may comprise a plurality of single-segment SFTs 104. The segment signals 208 may then be transmitted, in the appropriate timeslot 210, to indicate a particular segment 204. In another example, instead of arranging SFTs 104 into clusters 202, each SFT 104 may have a unique combination of one or more of frequency, timeslot, or other characteristics of EMS 106 that are used to identify a particular SFT 104 on the floor 102.

Figure 3:
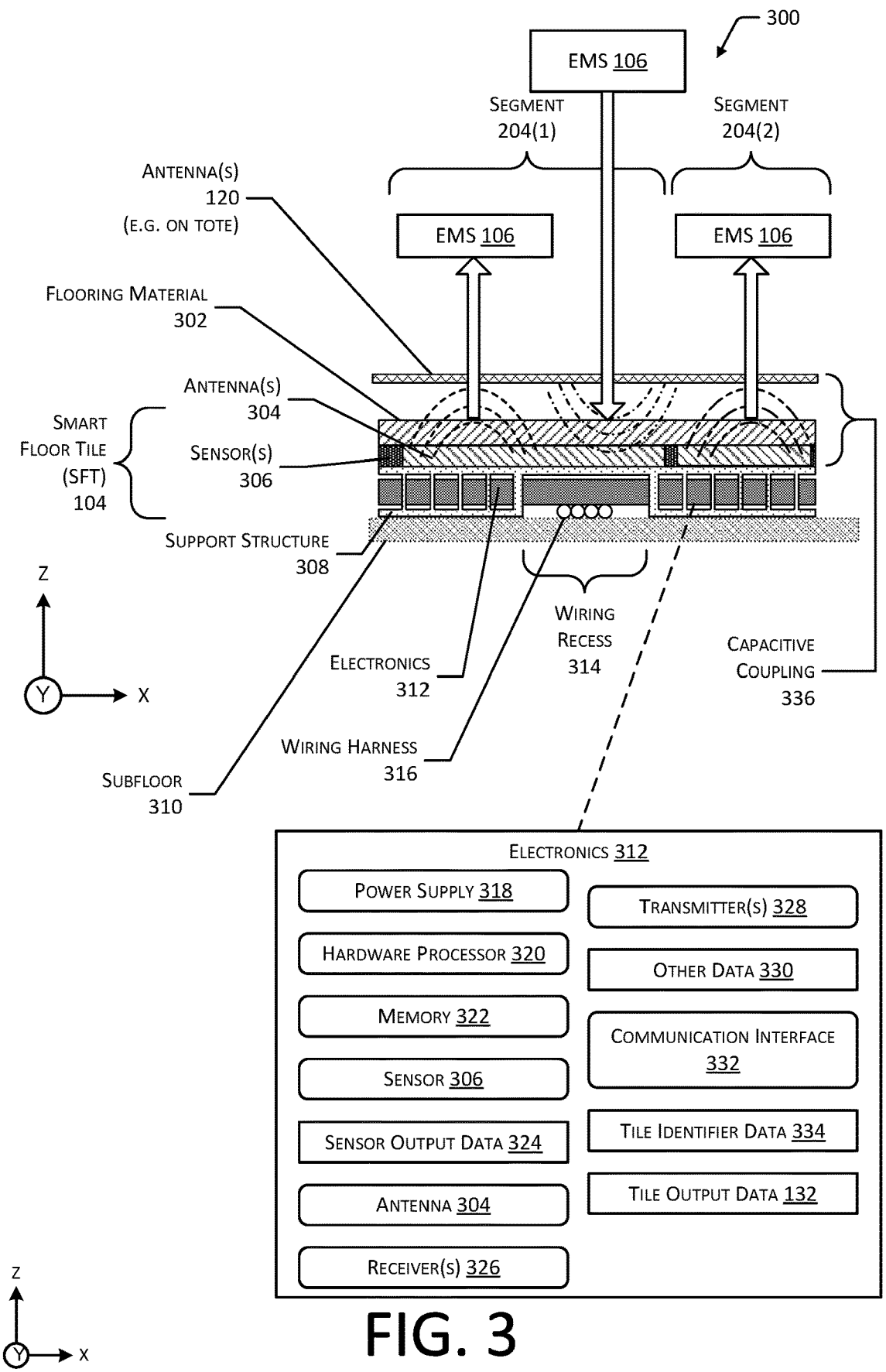
FIG. 3 illustrates the arrangement of components included in a smart floor tile, according to some implementations.

FIG. 3 illustrates the arrangement 300 of components included in a SFT 104, according to some implementations. A side view of a portion of the SFT 104 depicts a top layer comprising a protective material, such as flooring material 302. The flooring material 302 is electrically non-conductive under ordinary conditions. For example, the flooring material 302 may include plastic, ceramic, wood, textile, or other material. Beneath a layer of flooring material 302 may be one or more antennas 304 and one or more sensors 306. The sensors are discussed in more detail below. The antennas 304 may comprise structures designed to accept or emit EMS 106. In some implementations, the antennas 304 may also serve as the flooring material 302. For example, the antennas 304 may comprise aluminum or steel sheets upon which the users 112 walk. The active portion of the antenna 304 comprises that portion of the antenna 304 that is used to radiate or receive an EMS 106.

The SFT 104 may include a plurality of antennas 304. For example, the antennas 304 may be arranged to form an array. In some implementations, the active portion of the antennas 304 may have a surface area that occupies at least 1 square inch. Each segment 204 includes at least one segment antenna 304. The segment antenna 304 of the segment 204 may be the same size as the segment 204 or may be smaller. For example, the segment 204 may be a 3 by 3 inch square, but the segment antenna 304 in that segment 204 may only be a 2 by 2 inch square. In another example, the segment 204 may be a 3 by 3 inch square and the segment antenna 304 in that segment 204 may be a 3 by 3 inch square. Each segment antenna 304 may have a maximum size of sixteen square inches, in some implementations. The size of the segment antennas 304 may be determined at least in part based on the expected size of the objects in contact with the floor 102, such as the size of the foot of the user 112. In one implementation, antennas 304 may be shared, with a single antenna 304 being used to both transmit and receive simultaneously or at different times. In another implementation, separate antennas 304 may be used to transmit and receive.

The SFT 104 may also include a plurality of sensors 306 that may be arranged to form one or more arrays. For example, the sensors 306 may include weight sensors that measure the weight applied to a particular segment 204. The sensors 306 provide sensor output data. The arrangement of an array of one type of sensor may differ from another type of sensor. In some implementations, the sensors 306 may include a magnetometer that provides information about local magnetic fields.

As illustrated here, the antennas 304 may be located within a common plane. In other implementations, the antennas 304 may be arranged within a layer that is above the sensors 306, below the sensors 306, and so forth. A load bearing support structure 308 may be beneath the sensors 306 and the antennas 304 and provides mechanical and physical separation between the underlying subfloor 310 upon which the SFT 104 rests and the flooring material 302. The support structure 308 may comprise a series of pillars, posts, ribs, or other vertical elements. The support structure 308 may comprise a composite material, plastic, ceramic, metal, or other material. In some implementations, the support structure 308 may be omitted, and electronics 312 or structures associated with the electronics 312 may be used to support a load on the flooring material 302. For example, the electronics 312 may comprise a glass fiber circuit board that provides mechanical support while also providing a surface for mounting the electronics 312. The subfloor 310 may comprise concrete, plywood, or existing flooring materials over which the SFT 104 is installed. In some implementations, the SFT 104 may be affixed to the subfloor 310, or may be unaffixed or "floating". For example, the SFT 104 may be adhered to the subfloor 310 using a pressure sensitive adhesive.

The SFT 104 includes the electronics 312. The electronics 312 may include the elements described elsewhere in more detail. In the implementation depicted here, electronics 312 are arranged within the support structure 308. In some implementations, one or more of the antennas 304 or the sensors 306 may be located within the support structure 308. The support structure 308 may operate as a heat sink to dissipate heat generated by operation of the electronics 312.

The SFT 104 may incorporate a wiring recess 314 on an underside of the SFT 104. For example, the support structure 308 and the electronics 312 may be formed or arranged to provide a pathway for a wiring harness 316 to pass beneath at least a portion of the SFT 104. The wiring recess 314 may extend from one edge of the SFT 104 to another, may extend in different directions, and so forth. For example, the wiring recess 314 may be arranged in a "+" or cross shape, allowing for wiring harnesses 316 to pass along the X or Y axes as depicted here.

The wiring harness 316 may provide a coupling to one or more of the power supply 122, the network 124, and so forth. For example, the wiring harness 316 may include conductors that allow for the SFT 104 to receive electrical power from an electrical distribution network, allow for connection to a Controller Area Network (CAN) bus network that services a cluster 202 of SFTs 104, and so forth. The wiring harness 316 may include electrical conductors, electromagnetic waveguides, fiber optics, and so forth. In some implementations, a plurality of wiring harnesses 316 may be used. For example, a first wiring harness 316(1) may provide electrical power while a second wiring harness 316(2) provides network connectivity. In some implementations, the wiring harness 316 may be used to provide information that is then processed to determine a relative arrangement of SFTs 104.

The electronics 312 of the SFT 104 may include a power supply 318. The power supply 318 may include an electric power interface that allows for coupling to the power supply 122. For example, the electrical power interface may comprise connectors, voltage converters, frequency converters, and so forth. The power supply 318 may include circuitry that is configured to provide monitoring or other information with regard to the consumption of electrical power by the other electrical power components of the SFT 104. For example, the power supply 318 may include power conditioning circuitry, DC to DC converters, current limiting devices, current measurement devices, voltage measurement devices, and so forth. In some implementations, the SFT 104 may be configured to connect to redundant power buses. For example, a first electrical distribution network such as an "A" bus and a second electrical distribution network such as a "B" bus may be provided, each of which can provide sufficient electrical power for operation. In some implementations, the SFT 104 may incorporate redundant power supplies 318.

The SFT 104 may include one or more hardware processors 320. Hardware processors 320 may include microprocessors, microcontrollers, systems on a chip (SoC), field programmable gate arrays (FPGAs), and so forth. The SFT 104 may also include one or more memories 322. The memory 322 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 322 provides storage of computer-readable instructions, data structures, program modules, and other data for the operation of the SFT 104.

The SFT 104 may include electronics 312. The electronics 312 may be-configured to acquire information from sensors 306 of the SFT 104. In one implementation, the sensors 306 may comprise electrodes or other electrically conductive elements that are used as part of a capacitive sensor array. In one implementation, the electrodes may be arranged in an array. Each electrode may be rectangular with a first side and a second side, with the length of the first side and the second side being between 10 millimeters and 50 millimeters. In other implementations, other shapes and sizes of electrodes may be used.

The electronics 312 may include capacitance measurement circuitry that generates capacitance data. The capacitance measurement circuitry may use various techniques to determine capacitance. For example, the capacitance measurement circuitry may include a source that provides a predetermined voltage, a timer, and circuitry to measure voltage of the conductive element relative to the ground. By determining an amount of time that it takes to charge the conductive element to a particular voltage, the capacitance may be calculated. The capacitance measurement circuitry may use one or more of analog or digital circuits to determine capacitance. During operation, the capacitive sensor uses a conductive element located beneath the flooring material 302 to produce capacitance data indicating capacitance values at particular times. Based on the capacitance data, information such as a presence of an object, shape of an object, and so forth, may be generated to produce sensor output data 324. In some implementations, the tile output data 132 may include information indicative of one or more of the shape or size of an object. This tile output data 132 may then be subsequently used to determine the orientation 118. The sensor electronics 312 may be configured to scan the sensors 306 and generate sensor output data 324 at least 30 times per second. The sensor output data 324 may include information about proximity of an object with respect to a particular electrode. The sensor output data 324 may be further processed to generate the other data.

In other implementations, the sensors 306 may comprise optical touch sensors comprising one or more illuminators and one or more photodetector elements, resistive touch sensors comprising electrically resistive material, acoustic touch sensors comprising one or more transducers, and so forth. The sensors 306 may include other sensors, such as a weight sensors, moisture detectors, microphones, and so forth.

The SFT 104 may include a receiver 326. The receiver 326 is configured to detect the EMS 106. The receiver 326 may be implemented as discrete circuitry, as a software defined radio (SDR), and so forth. The receiver 326 is coupled to one or more of the antennas 304. In some implementations, a single receiver 326 may be coupled to a single antenna 304. In other implementations, a single receiver 326 may be coupled to a plurality of antennas 304 by way of switching circuitry, matching network, and so forth. The switching circuitry may allow the selective connection of a particular antenna 304 to the receiver 326. This selective connection may include the disconnection of one antenna 304 and connection of another antenna 304 at a particular time. The receiver 326 may be configured to detect the EMS 106 at a particular frequency and generate information indicative of a received signal strength.

In some implementations, elements of the sensors 306 may be combined or used in conjunction with the antennas 304. For example, electrically conductive elements may be used for both capacitive sensing by the sensor 306 and as antennas 304. This dual use may occur at the same time or may be multiplexed over time. For example, switching circuitry may, at a first time, selectively connect the sensor electronics 312 to the electrically conductive element for use as a capacitive sensor pad. The switching circuitry may then selectively connect, at a second time, the receiver 326 to the same electrically conductive element for use as an antenna 304.

The EMS 106 is acquired by the antenna 304 and then provided to the receiver 326. For example, the receiver 326 may comprise a superheterodyne receiver, with an incoming radio signal being converted to an intermediate frequency by a mixer. At the intermediate frequency stage, the down-converted signal is amplified and filtered before being fed to a demodulator. One or more antennas 304 may be dedicated for use by the receiver 326, while one or more other antennas 304 may be dedicated for use by the transmitter(s) 328. The use of separate antennas 304 to transmit and receive may improve isolation between the receiver 326 and the transmitter 328. The receiver 326 or the hardware processor 320 processes the EMS 106 to determine the characteristic data, such as a received frequency and the signal strength received at that frequency. In another implementation, the receiver 326 may comprise a SDR.

In some implementations, the EMS 106 may encode data. The receiver 326 or the hardware processor 320 decode, decrypt, or otherwise demodulate and process the demodulated signal to determine the characteristic data. For example, the receiver 326 may provide as output the digital representation of a signal that incorporates binary phase shift keying (BPSK) or other techniques. The hardware processor 320 may process this digital representation to recover a serial data stream that includes framing, error control data, payload, and other information. The payload may then be processed to produce output. The error control data may include error detection data such as parity check data, parity bits, hash values, and so forth. For example, a hash function may be applied to the characteristic data to generate hash output. A comparison of the hash output may be made to determine if an error is present.

The SFT 104 includes one or more transmitters 328. For example, the transmitter 328 may comprise a voltage controlled oscillator that generates an output signal that is fed directly to a power amplifier. The transmitter 328 couples to an antenna 304, which then radiates the EMS 106. The transmitter 328 may be implemented as discrete circuitry, SDR, or combination thereof.

The transmitter 328 may accept multiple signals to generate the EMS 106 that is emitted from an antenna 304 connected to the output of the transmitter 328. In some implementations, each segment 204 may utilize a single transmitter 328 that produces an EMS 106 that includes at least the segment signal 208. In other implementations, a single transmitter 328 may be used to generate all of the EMS 106 from a given SFT 104. For example, the transmitter 328 may generate the initial signal 206 and all the respective segment signals 208 for that SFT 104. Filters may be used on the output such that the antenna 304 at a particular segment 204 emits only the desired frequency associated with that particular segment 204.

The transmitter 328 may be configured to produce an output signal that is amplitude modulated, frequency modulated, phase modulated, and so forth. The transmitters 328 for the SFTs 104 in a given floor 102 may operate on a single frequency, or may be frequency agile and operate on a plurality of different frequencies. For example, at a first time, a single transmitter 328 may generate the segment signals 208 at a first frequency and then transition to transmitting at a second frequency. In some implementations, the receiver 326 and the transmitter 328 may be combined or share one or more components. For example, the receiver 326 and the transmitter 328 may share a common oscillator or frequency synthesizer.

In some implementations, a single antenna 304 may be used to both transmit and receive. For example, the receiver 326 may include notch filters to attenuate the frequencies of the transmitted EMS 106. A single antenna 304 may also be used to transmit different signals. For example, a single antenna 304 may be used to transmit the initial signal 206 and a segment signal 208. In some implementations, a diplexer may be used that accepts input from two or more transmitters 328 and provides output of the EMS 106 to an antenna 304 or group of antennas 304. In other implementations, the diplexer or other filtering may be omitted, and one or more transmitters 328 may be coupled to a single antenna 304 or group of antennas 304.

The hardware processor 320 may acquire data from one or more of the sensors 306, the receiver 326, the transmitter 328, and so forth, to generate other data 330. The other data 330 comprises information about an object that is resting on or proximate to the flooring material 302. The information may be indicative of a shape of the object. In some implementations, the other data 330 may comprise information that is representative of the contours of an object. For example, the other data 330 may comprise a bitmap representative of the output from a plurality of sensors 306 and is indicative of their relative arrangement. In another example, the other data 330 may comprise a vector value that is indicative of polygons used to represent an outline of an object. In some implementations, the other data 330 may be indicative of an area of the object. For example, the other data 330 may indicate that the total area of an object is 48 square centimeters. The other data 330 may include other information such as information about amplitude of a received EMS 106 with respect to different portions of the object. For example, other data 330 may be generated that indicates the shape of the object with information about amplitude, frequency, or other details about the EMS 106 at particular points or areas within that shape.

In some implementations, one or more of the receiver 326 or the transmitter 328 may be used to generate the sensor output data 324. For example, sensors 306 may communicate with the power supply 318 to determine the amount of electrical current that is being drawn at a particular time by the transmitter 328. As the electrical coupling between an object above the SFT 104 and one or more of the antennas 304 changes, one or more operating characteristics of the devices in the SFT 104 may change. For example, the impedance of the antenna 304 may experience change. Changes in the impedance may result in a change in the power output of the transmitter 328 during operation. For example, the transmitter 328 may exhibit an impedance mismatch with the antenna 304 in the presence of an object, such as a foot. This impedance mismatch may result in reduced power consumption by the radio frequency amplifier of the transmitter 328. Information about changes in the operational characteristics, such as a change in current draw by the transmitter 328, may be processed to determine the presence or absence of an object with respect to the antenna 304. The operating characteristics may include, but are not limited to: received signal strength at the receiver 326, power consumption of the transmitter 328, radio frequency power output of the transmitter 328, impedance presented at an antenna 304, standing wave ratio (SWR), and so forth. For example, the impedance of the antenna 304 may be measured at a radio frequency input to the receiver 326, a radio frequency output of the transmitter 328, and so forth. In another example, the SWR presented by one or more of the antenna 304 may be similarly measured. In other implementations, other operating characteristics may be used. For example, a change in the noise detected by the receiver 326 may be used to determine presence or absence of an object. In yet another implementation, the transmitter 328 of the SFT 104 may generate a signal that is then received by the receiver 326 of the same SFT 104. A change in the received signal at a particular antenna 304 may be used to determine the presence of an object. In still another implementation, the EMS 106 received from the other SFT 104 may be measured, and the received signal strength at particular segments 204 may be used to generate information indicative of the presence of an object.

By combining information from a plurality of antennas 304, other data 330 may be generated. In other implementations, other characteristics of the receiver 326 or the transmitter 328 may be assessed to generate the other data 330 or other information indicative of proximity of an object to the antenna 304. For example, the change in impedance may be measured, a change in background noise level may be measured, and so forth. In some implementations, radio ranging may be utilized in which the transmitter 328 emits a pulse and the receiver 326 listens for a return or echo of that pulse. Data indicative of proximity from several antennas 304 may then be processed to generate the other data 330. In another implementation, distance between the object and the antenna 304 may be determined using the amplitude of the received EMS 106. For example, a lookup table may be used that associates a particular received signal strength with a particular distance from the antenna 304.

The communication interface 332 connects the SFT 104 to the network 124. For example, the communication interface 332 may be able to connect to one or more of a Controller Area Network (CAN bus), Inter-Integrated Circuit (I2C), Serial Peripheral Interface bus (SPI), 1-Wire bus, Universal Serial Bus (USB) as promulgated by the USB Implementers Forum, RS-232, Ethernet, Wi-Fi, Bluetooth, and so forth. The communication may be facilitated by data connectors, such as optical connectors, electrical connectors, and so forth. The data connectors provide a pathway for signals to be exchanged between the communication interface 332 and the network 124.

The SFT 104 may include non-transitory computer readable media that is used to store instructions, data, and so forth. Tile identifier data 334 comprises information indicative of a particular SFT 104. The tile identifier data 334 may be unique within the particular network 124, the facility, unique across the production of all SFTs 104 manufactured, and so forth. In some implementations, a media access control (MAC) address, network address, bus address, and so forth, that is associated with the communication interface 332 may be used as tile identifier data 334.

During operation, the hardware processor 320 may generate tile output data 132. As described above, the tile output data 132 may include the characteristic data. In some implementations, the tile output data 132 may indicate the characteristic data that was received by the SFT 104, the particular antennas 304 or segments 204 associated with that reception, information about the frequencies of EMS 106 that are being transmitted, and so forth. The tile output data 132 may also include the tile identifier data 334, timestamp data, and so forth. For example, the timestamp data included in the tile output data 132 may indicate when the characteristic data was received by the receiver 326.

The SFT 104 may include multiple hardware processors 320 with different capabilities. For example, individual elements of the sensors 306 may utilize dedicated state machines to perform simple processing functions. These dedicated state machines may then send output data to a microcontroller that provides additional processing to generate sensor output data 324. In one implementation, the dedicated state machine may comprise a complex programmable logic device (CPLD). Continuing the example, a dedicated state machine may provide a 4-bit value indicative of the capacitance measured by a capacitive sensor 306 at a particular location on the SFT 104. The microcontroller may have information that describes a relative arrangement of the sensors 306, and may use this information in conjunction with the dedicated state machine output to generate a bitmap that may be included in the other data 330.

Various techniques may be used to increase the overall uptime of an individual SFT 104, and functionality of the floor 102 as a whole. In one implementation, the SFT 104 may include additional components to provide for failover redundancy. For example, the SFT 104 may include at least two hardware processors 320, each of which is able to generate other data 330, generate tile output data 132, and so forth. In another example, the SFT 104 may include two power supplies 318, each connected to a different bus or power supply 122.

To provide additional redundancy, adjacent SFTs 104 may be connected to different networks 124. For example, an SFT 104 may be connected to a first network 124(1) while the SFT 104 immediately to the right may be connected to a second network 124(2).

The SFT 104 may be configured to perform diagnostics of onboard components, adjacent SFTs 104, and so forth. For example, the SFT 104 may be configured to test the receiver 326 and the transmitter 328 by transmitting a signal from the first antenna 304(1) and listening with the receiver 326 with a second antenna 304(2) that is adjacent to the first antenna 304(1). In some implementations, the SFT 104 may be configured to send diagnostic data using the network 124. For example, diagnostic data may be sent to the inventory management system 136 indicating that a particular SFT 104 has a fault and requires repair or replacement. The SFT 104 may be designed in a modular fashion to allow for repair or replacement without affecting adjacent SFTs 104.

In some implementations, operation of the SFT 104 or the segments 204 therein may be responsive to presence or absence of an object. For example, segments 204 that are proximate to or underneath the object forming a shape may be deemed active segments. Antennas 304 associated with these active segments may be used to transmit or receive the EMS 106. Inactive segments comprise segments 204 that are not underneath or proximate to the shape. The determination of whether a segment 204 is active or not may be based at least in part on output from the sensor elements antennas 304, or other sensors. For example, a segment 204 may be deemed to be an active segment when the associated sensor element exhibits a capacitance value that exceeds a threshold level.

During operation, the determination of which segments 204 are active may be used to determine which antennas 304 are used to one or more of transmit or receive the EMS 106. For example, the antennas 304 beneath inactive segments may be disconnected from receivers 326, or the receivers 326 associated with those antennas 304 may be placed in a low power mode or turned off. As an object is detected by the sensor element as driven using the sensor electronics 312, a particular segment 204 may be designated as an active segment. The antenna 304 and associated radio frequency elements such as the receiver 326 and the transmitter 328 associated with that antenna 304 may be transitioned to an operational mode. Continuing the example, the receiver 326 may begin listening for an EMS 106.

The SFT 104, or portions thereof such as segments 204, may transition from a receive mode to a transmit mode or vice versa. This transition may be responsive to the detection of an object by the sensor 306. For example, the presence of an object followed by the absence of the object may result in the SFT 104 transitioning from the transmit mode to the receive mode.

By selectively transmitting the EMS 106 using antennas 304 that are within a threshold distance of the shape as determined by the sensors 306, performance of the system may be improved. For example, power consumption may be reduced by transmitting using only those antennas 304 that are proximate to the object producing the shape. In other implementations, the transmitters 328 may be activated on a particular schedule, such as transmitting for 50 milliseconds (ms) duration with a gap waiting time of 100 ms before the next transmission. This reduction in duty cycle decreases power consumption.

In some implementations, segments 204 may be in transmit mode while the receiver 326 is still active. For example, the transmitters 328 may transmit while the receiver 326 is listening.

The sensors 306 in the SFT 104 may be used to determine the presence of hazardous conditions at the SFT 104. For example, the sensors 306 may be able to detect a liquid that is present on the flooring material 302 that may comprise a slipping hazard. Continuing the example, a puddle of water on the flooring material 302 may be detected. Information indicative of the puddle may be provided to the inventory management system 136 for mitigation, such as clean up. In another example, the sensors 306 may be able to detect a user 112 lying on the flooring material 302. Upon such detection, an attendant of the facility may be alerted to provide assistance to the user 112. With this example, the floor 102 provides information to the operators the facility that may be used to improve the safety of the facility for the users 112.

Also depicted in this illustration, is at least a portion of the antenna 120 on a device such as a tote 116. The transfer of EMS 106 from a transmitting antenna to a receiving antenna may occur using at least in part capacitive coupling 336 between the two. Capacitive coupling involves a transfer of energy by means of a displacement current between two conductors, induced by an electric field. The displacement current may comprise a time-varying electric field. With capacitive coupling, each of the conductors acts as a plate for a capacitor.

Figure 4:
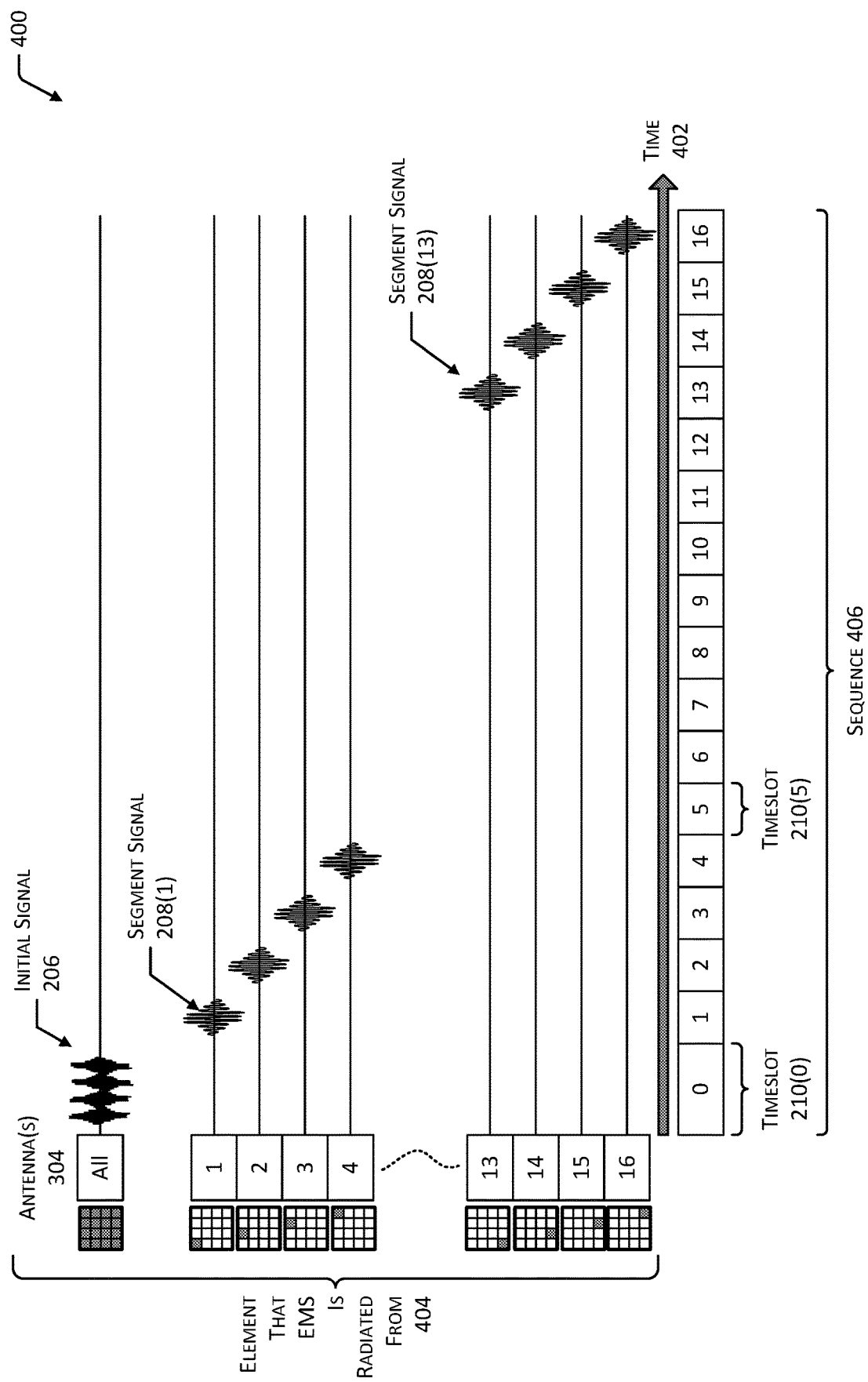
FIG. 4 illustrates the antennas of the smart floor tile that are used to emit signals in their respective timeslots, according to some implementations.

FIG. 4 illustrates a chart 400 of the antennas 304 of the SFT 104 that are used to emit EMS 106 in their respective timeslots 210, according to some implementations. As described above, each SFT 104 emits an EMS 106. The EMS 106 may be at a particular frequency that is associated with that SFT 104. During specified timeslots 210, the segment signal 208 is radiated from a particular antenna 304 in a particular segment 204.

In this illustration, the horizontal axis indicates time 402 increasing left to right. Various timeslots 210 ranging from timeslot 210(0) to 210(16) are depicted along the horizontal axis as well. The number of timeslots 210 may be associated with the number of segments 204 for an SFT 104. For example, an SFT 104 with 4 segments may have five timeslots 210, while an SFT 104 with 20 segments may have 21 timeslots 210. During the first timeslot 210(0), the initial signal 206 may be transmitted using one or more of the antennas 304. For example, as depicted here, all of the antennas 304 of the SFT 104 may be used to radiate the initial signal 206. In other implementations, other arrangements of antennas 304 may be used. For example, every other antenna 304 may be used, or a dedicated antenna 304 that extends across the SFT 104 may be used. As described above, the initial signal 206 may be used by a receiver 326 for synchronization. In some implementations, the initial signal 206 and corresponding timeslot 210(0) may be omitted. For example, instead of the initial signal 206 being transmitted, the clock signal 128 may be used to synchronize the SFTs 104.

In some implementations, the synchronization of the SFTs 104 does not have to be stringent. Instead, adjacent SFTs 104 may be synchronized to one another within a threshold limit. For example, SFT 104(1) and SFT 104(2) which are next to one another may be synchronized to within 1 ms, while SFTs at opposite ends of the facility may be out of sync due to propagation delays of the clock signal 128, with the system still operating normally. In one implementation, the clock signal 128 may be received by the SFT 104. A clock onboard the SFT 104 may be set based on the timing signal. Once set, the clock may be used to determine timing for when timeslots 210 begin, end, and so forth.

The initial signal 206 may also provide other operational benefits. For example, the initial signal 206 may be used to minimize the sampling of noise by the receiver 326 by acting as a signal to break squelch on the receiver.

The vertical axis depicts the various elements that the EMS 106 is being radiated from 404. For example, the initial signal 206 is radiated using all antennas 304. During timeslot 210(1), the segment signal 208(1) is radiated from the one or more antennas 304 associated with the first segment 204(1). Likewise, during timeslot 210(2), the segment signal 208(2) is radiated from the one or more antennas 304 associated with the second segment 204(2), and so forth. During the particular timeslot 210, each segment 204 thus radiates an EMS 106.

A sequence 406 comprises the particular pattern of emission of the EMS 106 from the respective antennas 304 as described. The sequence 406 may be repeated. For example, the sequence 406 may continuously loop, with the SFT 104 transmitting at a designated frequency the initial signal 206 and segment signal 208 in the respective timeslots 210.

In one implementation, the SFT 104 transmits all of the segment signals 208 on a single frequency. In other implementations, the SFT 104 may use different frequencies to transmit the segment signals 208. For example, in addition to transmitting during particular timeslots 210 and using particular antennas 304 for a particular segment 204, each segment signal 208 may be transmitted at a different frequency.

In some implementations, one or more of the initial signal 206, the segment signal 208, or other EMS 106 may be modulated to convey information. For example, the segment signal 208 may be modulated to include a 4-bit value. The information conveyed may be indicative of the SFT 104 identifier, a segment identifier, power output level of the transmitted signal, and so forth. In another example, the initial signal 206 may be modulated to include a predetermined preamble value, such as a predetermined series of all binary 0's, all binary 1's, alternating binary 0's and 1's, and so forth.

As described above, in some implementations, this technique may be used to identify particular SFTs 104. For example, each SFT 104 may comprise a single segment 204, with that segment 204 associated with a particular timeslot 210. As a result, each single segment SFT 104 would transmit within a particular timeslot 210 to identify itself.

Figure 5:
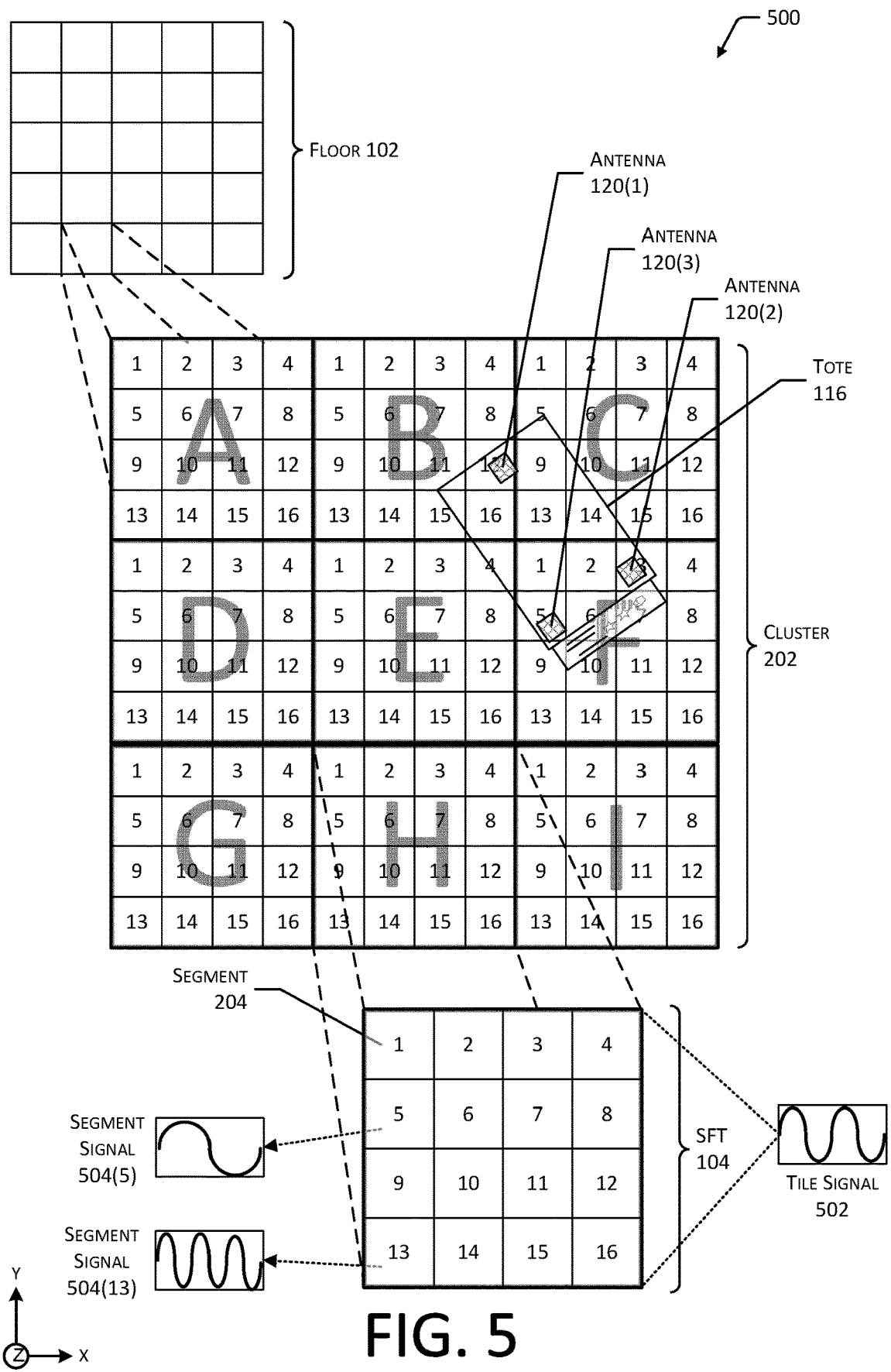
FIG. 5 illustrates an arrangement of smart floor tiles and their respective segments emitting signals at different frequencies, according to some implementations.

FIG. 5 illustrates an arrangement 500 of smart floor tiles and their respective segments 204 emitting signals at different frequencies, according to some implementations.

The SFT 104 transmits a tile signal 502 and one or more segment signals 504. Together, these signals comprise the EMS 106 emitted by the SFT 104. The tile signal 502 is transmitted at a first frequency that is representative of that particular SFT 104 within a particular cluster 202. The segment signal 504 is transmitted at a second frequency that is different from the first and is representative of the particular segment 204 within a particular SFT 104. For example, the frequencies used for the tile signal 502 may begin at 40 kHz with 1 kHz spacing, resulting in SFT 104(A) using 40 kHz, SFT 104(B) using 41 kHz, SFT 104(C) using 42 kHz, and so forth. Continuing the example, the segment signals 504 may begin at 50 kHz with 1 kHz spacing, resulting in segments 204(1) using 50 kHz, segments 204(2) representing 51 kHz, and so forth. This notation and these frequencies are provided by way of illustration and not necessarily as limitations.

The EMS 106 as emitted may exhibit sinusoidal waveforms. In other implementations other waveforms such as square, triangle, sawtooth, and so forth may be used. Use of sinusoidal waveforms may allow for reduced channel spacing and minimize adjacent channel interference. The EMS 106 may be transmitted at fixed carrier frequencies of between 20 kHz and 30 MHz. In other implementations other frequencies may be used. The SFTs 104 may be configurable, such that they may be installed and then configured to provide a particular segment signal 504 at a particular frequency after physical installation of the SFT 104.

As with FIG. 2, in this illustration, a tote 116 is depicted. Users 112 are omitted for clarity, and not as a limitation. The tote 116 includes three antennas 120 in an asymmetric arrangement. A first antenna 120(1) is proximate to SFT 104(B)(12), a second antenna 120(2) is proximate to SFT 104(F)(3), and a third antenna 120(3) is proximate to SFT 104(F)(5). The antennas 120 of the tote 116 may capacitively couple to antennas within the SFTs 104 proximate to them.

Figure 6:
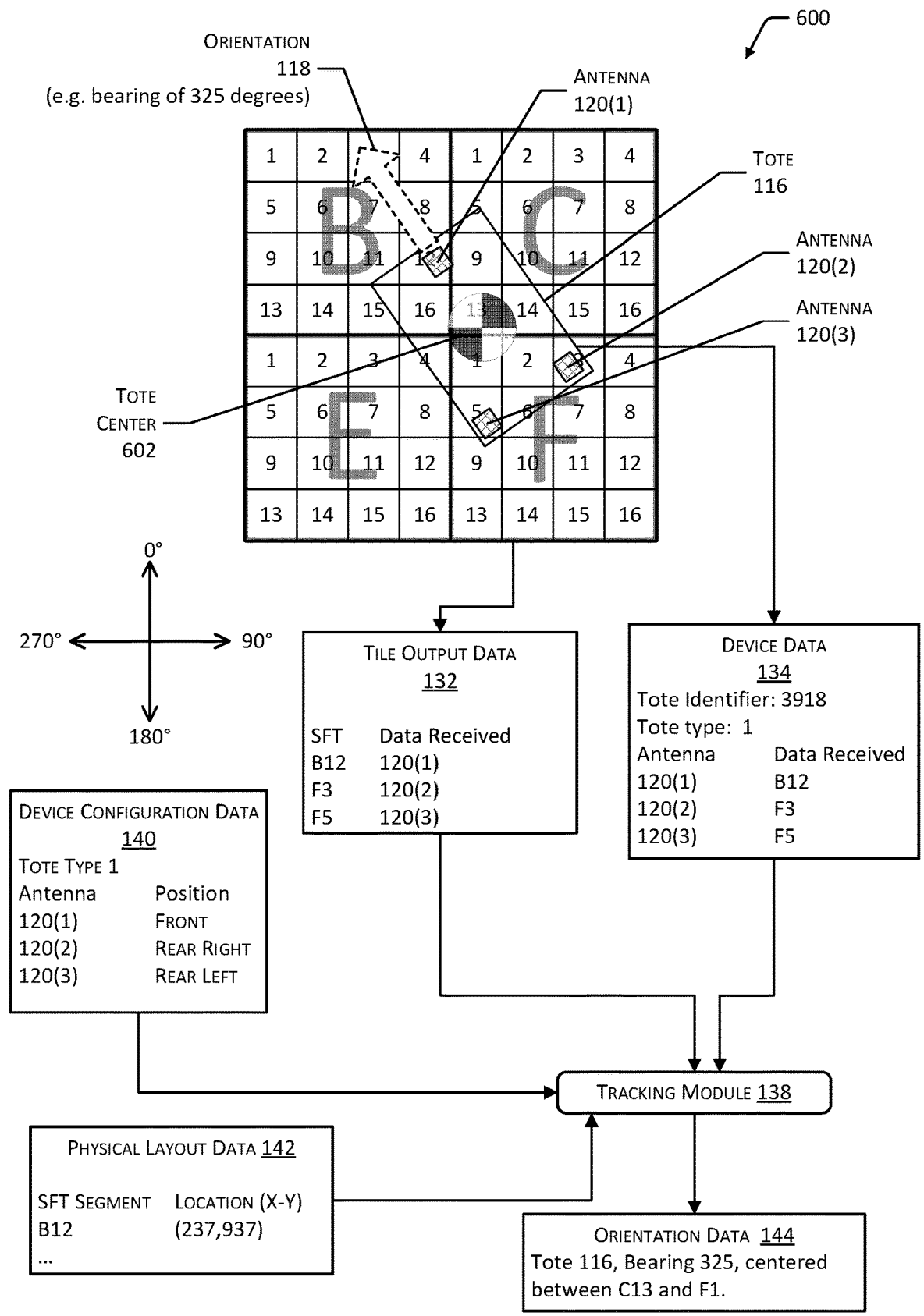
FIG. 6 illustrates a block diagram of data used to determine location and orientation of a tote or other moveable device, according to some implementations.

FIG. 6 illustrates a block diagram 600 of data used to determine location and orientation of a tote 116 or other moveable device, according to some implementations. The tote 116 is depicted by way of illustration, and not necessarily as a limitation. The same mechanisms, techniques, and modes may be used for other objects including, but not limited to, fixtures 108, robots, and so forth.

In this illustration, a portion of the floor 102 is depicted upon which a tote 116 is resting. The tote 116 exhibits an orientation 118 of 325 degrees relative to the floor 102. The tote 116 includes three antennas 120(1), 120(2), and 120(3) emplaced in an asymmetric arrangement with each antenna at a vertex of an isosceles triangle. A first antenna 120(1) is proximate to SFT 104(B)(12), a second antenna 120(2) is proximate to SFT 104(F)(3), and a third antenna 120(3) is proximate to SFT 104(F)(5). A tote center 602 is located at a geometric center of the structure of the tote 116, approximately above the location of SFT 104(C)(13).

The systems described in this disclosure may be operated in several modes. These may include the tote 116 actively transmitting an EMS 106 to the SFT 104, the tote 116 actively receiving signals from the SFT 104, the tote 116 utilizing a passive antenna to distribute EMS 106 from one SFT 104 to another, or a combination thereof.

The active transmitting mode may include several modes. In a first mode, the tote 116 may emit the same EMS 106 from all of the antennas 120. In a second mode, the tote 116 may emit EMS 106 that differ from one another from different antennas 120. Information about which antenna 120 is being used to emit a particular EMS 106 may be maintained.

The active receiving mode may include several modes. In a first mode, the tote 116 may receive EMS 106 from the different antennas 120 without regard to the particular antenna 120 used. In a second mode, the tote 116 may receive EMS 106 from the different antennas 120. Information about the particular antenna 120 used to receive the EMS 106 may be maintained.

Depicted in this block diagram 600 are the different types of data that may be used to determine orientation data 144, tracking data 146, and so forth.

Shown here are examples of some information that may be included in tile output data 132 and device data 134. Other information, such as received signal strength, phase, timing information, and so forth may also be included but are not depicted here.

The tile output data 132 may include one or more of information indicative of the SFT 104 or segment 204 thereof that detected a signal, information about the signal, and so forth. For example, as shown here, the tile output data 132 from the floor 102 indicates that SFT 104(B)(12) received data indicative of antenna 120(1), SFT 104(F)(3) received data indicative of antenna 120(2), and SFT 104(F)(5) received data indicative of antenna 120(3). Information indicative of the particular antenna 120 may be provided by using particular frequencies, timeslots, encoding data in the EMS 106, and so forth.

The device data 134 may include one or more of information indicative of the particular tote 116, such as a tote identifier, tote type, and so forth. For example, the tote identifier may be indicative of a particular tote 116. The tote identifier may comprise a serial number, identification number, media access control (MAC) address, network address, and so forth. The device data 134 may also include information about the EMS 106 received by the antennas 120 thereon. For example, as shown here the device data 134 indicates that antenna 120(1) received data from SFT 104(B)(12), antenna 120(2) received data from SFT 104(F)(3), and antenna 120(3) received data from SFT 104(F)(5).

Also depicted is an example of device configuration data 140. The device configuration data 140 provides information about the particular arrangement of the antennas 120 for the type of tote 116 in use. For example, the device configuration data 140 indicates that antenna 120(1) is in a "front" position, antenna 120(2) is in an "rear right" position, and antenna 120(3) is in a "rear left" position. In other implementations the position data may be expressed in terms of coordinates or measurements associated with the point of reference on the particular device or type of device.

The tracking module 138 may receive one or more of the tile output data 132 or the device data 134 and may access the device configuration data 140 to determine orientation data 144, location of the tote center 602, and so forth. For example, the SFT 104 detects the EMS 106 that is radiated from the antenna 120 on the tote 116, and produces tile output data 132. Given the known location of the SFT 104, the location of the antenna 120 on the tote 116 at the time the EMS 106 was detected may be deemed to be the same as that of the known location of the SFT 104 (or segment 204 thereof).

The orientation data 144 may be determined in several ways. In one implementation, the locations of the detected EMS 106 as indicated by the tile output data 132 may be compared with the information in the device configuration data 140 to determine a correspondence. For example, if the relative spacing and physical configuration of the segments 204 that detected an EMS 106 from a tote 116 correspond to that specified in the device configuration data 140 within a threshold tolerance, the tote 116 may be deemed present and in a particular orientation. The correspondence may be determined based on geometry, spacing, time invariance and so forth. For example, if the relative arrangement and spacing of the detected EMS 106 remains constant within a threshold value from one time to another, albeit rotated or translated with respect to the floor 102, that arrangement may be deemed time invariant. A lack of correspondence may occur when the pattern of arrangement of detected EMS 106 is time variant, does not correspond such as a straight line that does not comport with the triangular arrangement that is expected, exhibits dimensions that do not correspond to the device, and so forth.

In one implementation, one or more SFTs 104 of the floor 102 receive EMSs 106 generated by the tote 116 and radiated using the antennas 120(1)-(3) in the tote 116. The tile output data 132 provides information about which SFTs 104 or segments 204 thereof received the EMSs 106. The tracking module 138 accesses the tile output data 132 received from the SFTs 104. The device configuration data 140 for that particular tote 116 or type of tote 116 is accessed. The device configuration data 140 is indicative of the arrangement of the antennas 120(1)-(3) with respect to one another as mounted to the structure of the tote 116. The device configuration data 140 also provides information indicative of orientation 118 of the tote 116 with respect to the antennas 120(1)-(3). For example, the orientation 118 may be based on the isosceles triangle arrangement indicated here, with antenna 120(1) at the apex of this triangle being at the front of the tote 116. The tracking module 138 may also access physical layout data 142 indicative of arrangement of the antennas 304 in the SFTs 104 with respect to one another within the smart floor 102. The arrangement indicated by the tile output data 132 may be determined to correspond within a threshold value to the device configuration data 140. For example, the arrangement in two-dimensional space of the antennas 304 may correspond to the arrangement in two-dimensional space of the antennas 120. The orientation 118 of the tote 116 may be determined based on this correspondence and using the device configuration data 140 that indicates the orientation 118 of the tote 116 with respect to the antennas 120. For example, the apex of the isosceles triangle arrangement of the antennas 120 may be known to be the front of the tote 116.

The tracking module 138 may determine a correspondence between a plurality of points on the tote 116 with particular locations on the floor 102. Once the particular points on the floor 102 have been determined, they may be transformed into whatever coordinate or addressing system is deemed suitable for further use. Given either the asymmetrical placement of the antennas 120, or the ability to emit different EMS 106 from different antennas or receive particular EMS 106 from particular antennas 120, directionality of the tote 116 may be determined. For example, the tote 116 may include an antenna 120(4) at the front and an antenna 120(5) at the back. By transmitting different EMS 106 from these antennas that result in tile output data 132 indicative of these distinct antennas, or by receiving at the tote 116 a first EMS 106(1) from one SFT 104 using the antenna 120(4) known to be at the front and a second EMS 106(2) from another SFT 104 using the antenna 120(5) known to be at the back, the orientation 118 of the tote 116 may be established.

In some implementations orientation 118 may be determined onboard the tote 116 using previously stored information about the physical layout of the SFT 104. For example, assume a front antenna 120(6) is arranged at a front midline position of the tote 116, while a back antenna 120(7) is arranged at a rear midline position of the tote 116. In this example, the front antenna 120(6) receives a signal from SFT 104(B)(6) while the rear antenna 120(7) receives a signal from SFT 104(E)(6). Using known information of the layout of the floor 102 as depicted in this figure and the relative placement of the antennas 120(6) and (7), the orientation data 144 indicative of an orientation 118 of "0" degrees with respect to the row and columnar layout of the SFTs 104 may be determined.

The device configuration data 140 may also be used by the tracking module 138 to determine the tote center 602. Continuing the example, given information about the relative placement of the front antenna 120(6) and the rear antenna 120(7), the tote center 602 may be determined.

Figure 7:
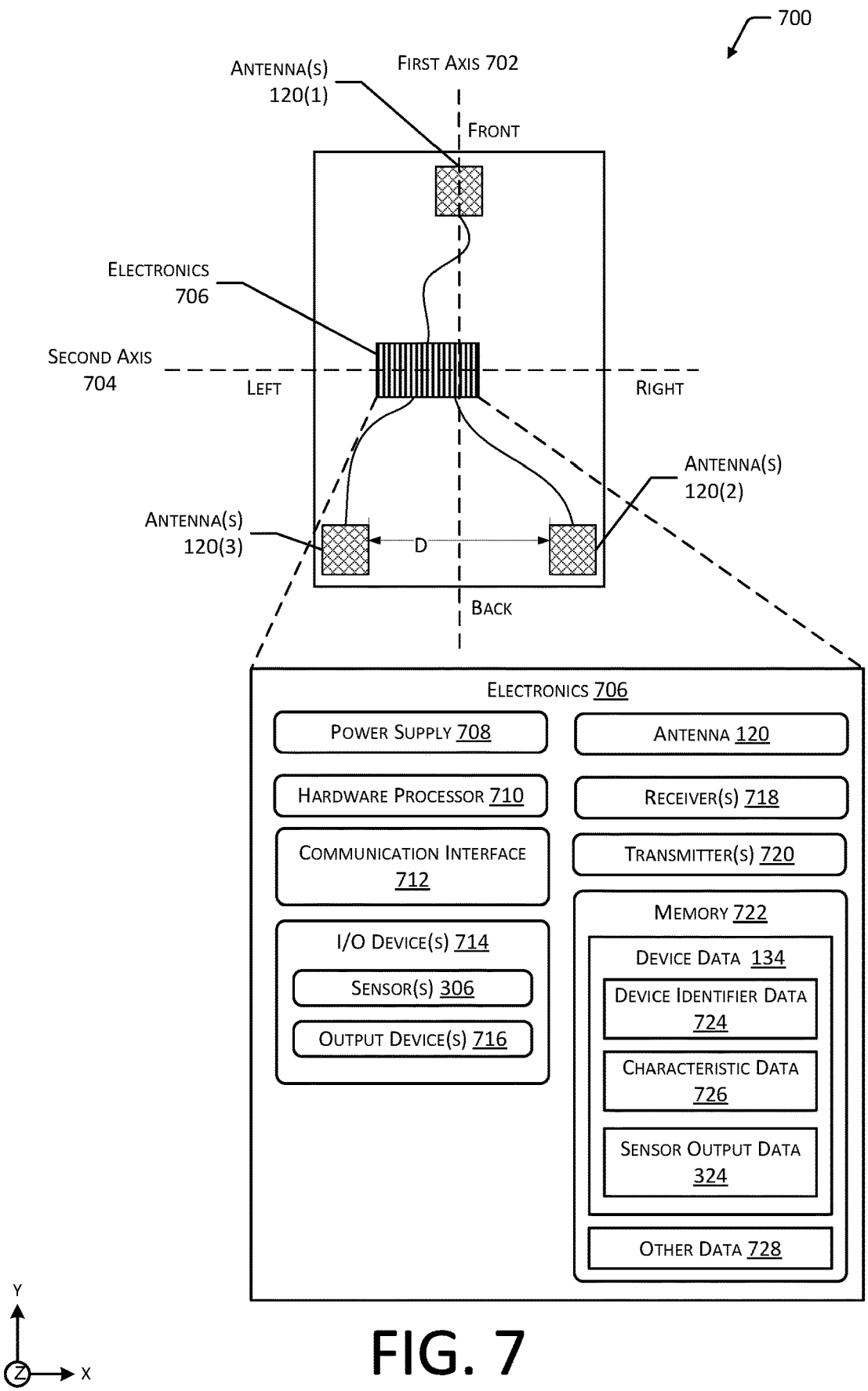
FIG. 7 depicts a block diagram of a moveable device such as a tote and the relative placement of antennas on the moveable device, according to some implementations.

FIG. 7 depicts a block diagram of a moveable device 700 such as a tote 116 and the relative placement of antennas 120 on the device 700, according to some implementations.

A device 700 is depicted having a generally rectangular overall structure when viewed from above. In other implementations, the device 700 may have other shapes.

The device 700 may include one or more antennas 120. Three antennas 120(1)-(3) are depicted and are arranged at the vertices of an isosceles triangle. The resulting arrangement is asymmetric with respect to at least one axis of the device 700. A first antenna 120(1) is mounted to a front of the structure and proximate to a bottom of the structure. A second antenna 120(2) is mounted proximate to a first corner at a back of the structure and proximate to the bottom of the structure. A third antenna 120(3) is mounted proximate to a second corner at the back of the structure and proximate to the bottom of the structure. For example, the antennas are symmetrical about a first axis 702, but are asymmetrical about a second axis 704.

The antennas 120 may be mounted to the structure of the device 700 such that a minimum distance "D" between the edges of any two antennas 120 is greater than a width of a segment 204 of an SFT 104, or the antenna 304 in the SFT 104. For example, if the segments are 3 by 3 inches square, the distance "D" between the edges of antennas 120(2) and 120(3) should be greater than 3 inches. In some implementations the minimum distance may be the maximum span of a segment, such as a diagonal line extended from one corner to an opposing corner. Continuing the earlier example with a 3×3 inch tile, the span would be approximately 4.24 inches.

The antennas 120 may be also mounted to prevent inadvertent direct contact with other objects. For example, the antennas 120 shown here are mounted such that their respective perimeters are maintained at a minimum distance from a perimeter of the structure of the tote 116. For example, the edge of the antennas 120 may be two millimeters away from the outermost edge of the structure. The structure thus overhanging or otherwise extending beyond the outermost edge of the antennas 120 serves as a physical stop to prevent the antenna 120 from making contact with another object, such as a fixture 108. In other implementations, the antennas 120 may be mounted at the perimeter, but may be enclosed or covered within an insulating material.

The antennas 120 may be connected to electronics 706. The electronics 706 of the SFT 104 may include a power supply 708. The power supply 708 provides electrical power to the electronics 706 and may include one or more of batteries, fuel cells, capacitors, wireless power receivers, photovoltaic cells, and so forth.

The electronics 706 may include one or more hardware processors 710. Hardware processors 710 may include microprocessors, microcontrollers, systems on a chip (SoC), field programmable gate arrays (FPGAs), and so forth.

A communication interface 712 connects the device 700 to the network 124. For example, the communication interface 712 may be used to communicate with a wireless access point 130 using a wireless local area network protocol, such as Wi-Fi. In another example, the communication interface 712 may use another wireless protocol, such as Zigbee, Bluetooth, and so forth to communicate with the network 124 or a device connected to the network 124. In some implementations, the communication interface 712 may utilize frequencies above 200 MHz to send and receive data. For example, the communication interface 712 may utilize a radio operating in one or more of the 2.4 GHz or 5 GHz bands. The communication interface 712 may be bidirectional in that it is able to send and receive data.

The electronics 706 may include one or more input/output (I/O) devices 714. These may include one or more of sensors 306 or output devices 716. For example, the sensors 306 may comprise weight sensors 306(1) that measure a weight of a load carried by the tote 116. The I/O devices 714 may also include output devices 716 such as one or more of a display device, printer, audio speakers, and so forth.

The electronics 706 may include one or more receivers 718. The receiver 718 is configured to detect the EMS 106. The receiver 718 may be implemented as discrete circuitry, as a software defined radio (SDR), and so forth. The receiver 718 is coupled to one or more of the antennas 120. In some implementations, a single receiver 718 may be coupled to a single antenna 120. In other implementations, a single receiver 718 may be coupled to a plurality of antennas 120 by way of switching circuitry, matching network, and so forth. The switching circuitry may allow the selective connection of a particular antenna 120 to the receiver 718. This selective connection may include the disconnection of one antenna 120 and connection of another antenna 120 at a particular time. The receiver 718 may be configured to detect the EMS 106 at a particular frequency and generate information indicative of a received signal strength, antenna 120 used, and so forth.

The antennas 120 may comprise an electrically conductive material. For example, an antenna 120 may comprise a sheet of aluminum or copper foil or plate. In one implementation, the antenna 120 may comprise copper that has been deposited or laminated onto a printed circuit board. The size of the antenna 120 may be proportionate to the size of the segments 204 of the SFT 104. For example, the antenna 120 may be configured to have a size that is less than or equal to the dimensions of the segments 204 in the SFT 104.

The electronics 706 may include one or more transmitters 720. For example, the transmitter 720 may comprise a voltage controlled oscillator that generates an output signal that is fed directly to a power amplifier to produce the EMS 106. The transmitter 720 may be configured to produce an output signal that is amplitude modulated, frequency modulated, phase modulated, and so forth.

The transmitters 720 for the devices 700 in a facility may operate on a single frequency, or may be frequency agile and operate on a plurality of different frequencies. For example, at a first time, a single transmitter 720 may generate the EMS 106 at a first frequency and then transition to generating the EMS 106 at a second frequency. In some implementations, the receiver 718 and the transmitter 720 may be combined or share one or more components. For example, the receiver 718 and the transmitter 720 may share a common oscillator or frequency synthesizer. The transmitter 720 may be implemented as discrete circuitry, SDR, or a combination thereof. The transmitter 720 couples to an antenna 120, which then radiates the EMS 106.

In some implementations the transmitters 328 of the SFTs 104 may operate at different frequencies than the transmitters 720 of the devices 700. For example, the SFTs 104 may transmit their EMS 106 at 4.2 MHz while the devices 700 may transmit their EMS 106 at 5.7 MHz.

In one implementation, each antenna 120 may utilize a separate transmitter 720 that produces an EMS 106. The same or different EMS 106 may be radiated from particular antennas 120. For example, an EMS 106(1) transmitting in a first timeslot may be radiated by antenna 120(1), while an EMS 106(2) transmitting in a second timeslot may be radiated by antenna 120(2), and so forth. The device data 134 may be indicative of the antenna 120 used to radiate a particular EMS 106.

In other implementations, the same transmitter 720 may be used to generate all of the EMS 106 emitted from a given device 700. For example, the transmitter 720 may generate a first EMS 106(1) for emission using the first antenna 120(1) and a second EMS 106(2) for emission using the second antenna 120(2). These EMSs 106 may be generated such that they differ in modulation, timing, frequency, phase, and so forth. As described above, the switching circuitry may selectively connect the output of the transmitter 720 to a particular antenna 120. In another implementation, the transmitter 720 may produce output at multiple frequencies, and filters may be used on the output such that a particular antenna 120 emits only a desired frequency associated with that particular antenna 120.

In another implementation, a single transmitter 720 may be coupled to a plurality of antennas 120 by way of switching circuitry, matching network, and so forth. The switching circuitry may allow the selective connection of a particular antenna 120 to the transmitter 720. This selective connection may include the disconnection of one antenna 120 and connection of another antenna 120 at a particular time. Once connected, the antenna 120 radiates the EMS 106.

A single antenna 120 may be used to both transmit and receive. For example, the receiver 718 may include notch filters to attenuate the frequencies of the transmitted EMS 106. A single antenna 120 may also be used to transmit different signals. In some implementations, a diplexer may be used that accepts input from two or more transmitters 720 and provides output of the EMS 106 to an antenna 120 or group of antennas 120. In other implementations, the diplexer or other filtering may be omitted, and one or more transmitters 720 may be coupled to a single antenna 120 or group of antennas 120.

The device 700 may also include one or more memories 722. The memory 722 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 722 provides storage of computer-readable instructions, data structures, program modules, and other data for the operation of the device 700.

In some implementations, the EMS 106 may encode data. The receiver 718 or the hardware processor 710 may be used to decode, decrypt, or otherwise demodulate and process the demodulated signal to determine the encoded data. For example, the receiver 718 may provide as output the digital representation of a signal that incorporates binary phase shift keying (BPSK) or other techniques. The hardware processor 710 may process this digital representation to recover a serial data stream that includes framing, error control data, payload, and other information. The payload may then be processed to produce output. The error control data may include error detection data such as parity check data, parity bits, hash values, and so forth. For example, a hash function may be applied to the characteristic data to generate hash output. A comparison of the hash output may be made to determine if an error is present.

The hardware processor 710 may generate or access the device data 134. The device data 134 may include one or more of device identifier data 724, characteristic data 726, sensor output data 324, or other data 728. The device identifier data 724 provides information indicative of the particular device 700. The device identifier data 724 may be unique within the particular network 124, the facility, unique across the production of all devices 700 manufactured, and so forth. For example, the device identifier data 724 may be indicative of a particular serial number. In some implementations, a media access control (MAC) address, network address, or other value associated with the communication interface 712 may be used as device identifier data 724.

The characteristic data 726 may include information about EMS 106 transmitted or received by the device 700. For example, the characteristic data 726 may include data indicative of the particular antennas 120 associated with reception or transmission of the EMS 106, frequencies used, timeslots used, and so forth. For example, the characteristic data 726 may include information indicative of the timeslot and frequency at which the device 700 emits a signal. Likewise, the characteristic data 726 may include information such as a timestamp indicative of when the EMS 106 was received, the received signal strength of EMS 106 that are received by the device 700, a time differential between receipt of an initial signal 206 and a segment signal 208, and so forth.

The sensor output data 324 comprises data obtained or derived from one or more sensors 306. For example, the sensor output data 324 may comprise information indicative of input to a touch pad, image data from a camera, and so forth.

The electronics 706 may generate other data 728 as well. For example, the other data 728 may include orientation data 144 that has been determined onboard the device 700 using the hardware processor 710.

The hardware processor 710 may use one or more of the communication interface 712 or the transmitter 720 to send the device data 134 or other data 728 to the inventory management system 136. For example, hardware processor 710 may use the communication interface 712 to establish a Wi-Fi connection with the network 124 to transmit the device data 134 or other data 728 to the inventory management system 136. In another example, the hardware processor 710 may use the transmitter 720 to transmit the data to the SFT 104 which in turn provides the data to the network 124.

Various data may be encoded within the EMS 106 generated by the transmitter 720. For example, the device 700 may transmit the device identifier data 724, the characteristic data 726 of received EMS 106, the characteristic data 726 of transmitted EMS 106, the sensor output data 324, and so forth. In one implementation, the EMS 106 radiated from a particular antenna 120 may provide information indicative of the relative placement of that antenna 120 with respect to the structure. For example, the EMS 106 as radiated may include a binary value that indicates that the antenna 120 used to radiate the signal was at the front or at the back of the device 700. The data indicative of relative placement may be indicative of a front, back, left, right, first corner, second corner, and so forth.

In some implementations, the device 700 may utilize one or more of the same or similar techniques and hardware as the receivers 326 or the transmitters 328 of the SFT 104 described above. For example, the device 700 may utilize power saving modes similar to those described above.

Figure 8:
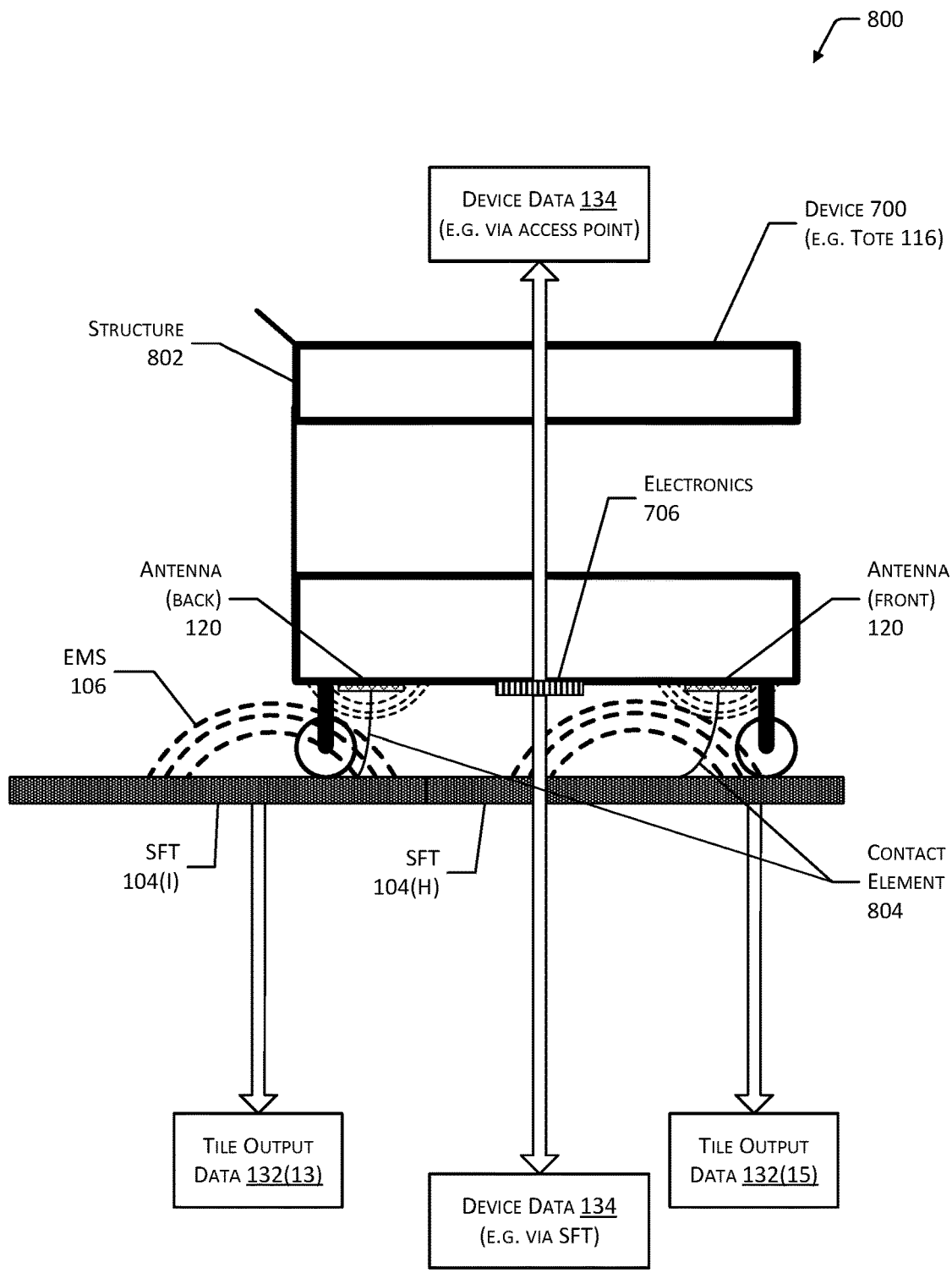
FIG. 8 illustrates a side view of the moveable device and techniques to transmit device data from the moveable device to an external device, according to some implementations.

FIG. 8 illustrates a side view 800 of the moveable device 700 and techniques to transmit device data 134 or a portion thereof from the moveable device 700 to an external device, according to some implementations.

As described above, the moveable device 700 may include one or more antennas 120, electronics 706, and so forth. The moveable device 700 may include a structure 802 that provides support for other components, such as wheels, baskets, platforms, shelves, the electronics 706, and so forth. For example, the structure 802 may comprise metal, plastic, composite material, and so forth.

The antennas 120 may be mounted such that they are proximate to the floor 102. For example, the antennas 120 may be mounted to an underside of the structure 802. The mounting of the antennas 120 may be such that they are protected from inadvertent contact with other objects. For example, the antennas 120 may be on an underside of the bottom of the structure 802 and may be slightly inset from the perimeter of the structure 802. In the event the structure 802 comes into contact with another object, such as a shelf, this inset prevents the antenna 120 from coming into contact with the shelf. In some implementations, the inset may be configured to be such that capacitive coupling between the antenna 120 and the other object will be below a threshold value.

As described above, the device 700 may transmit information such as the device data 134 using the communication interface 712, the transmitter 720 via the access point 130, or a combination thereof. For example, the device 700 may transmit a device identifier that is indicative of one or more of the particular device or a type of the device.

The device 700 may be equipped with one or more contact elements 804. The contact elements 804 provide an electrically conductive pathway to a point that is proximate to or in contact with the flooring material 302. For example, the contact element 804 may comprise a steel member that extends from the structure 802 to the floor 102. In some implementations the contact element 804 may be used as the antenna 120. In other implementations the contact element 804 may be affixed to or part of the antenna 120.

Figure 9:
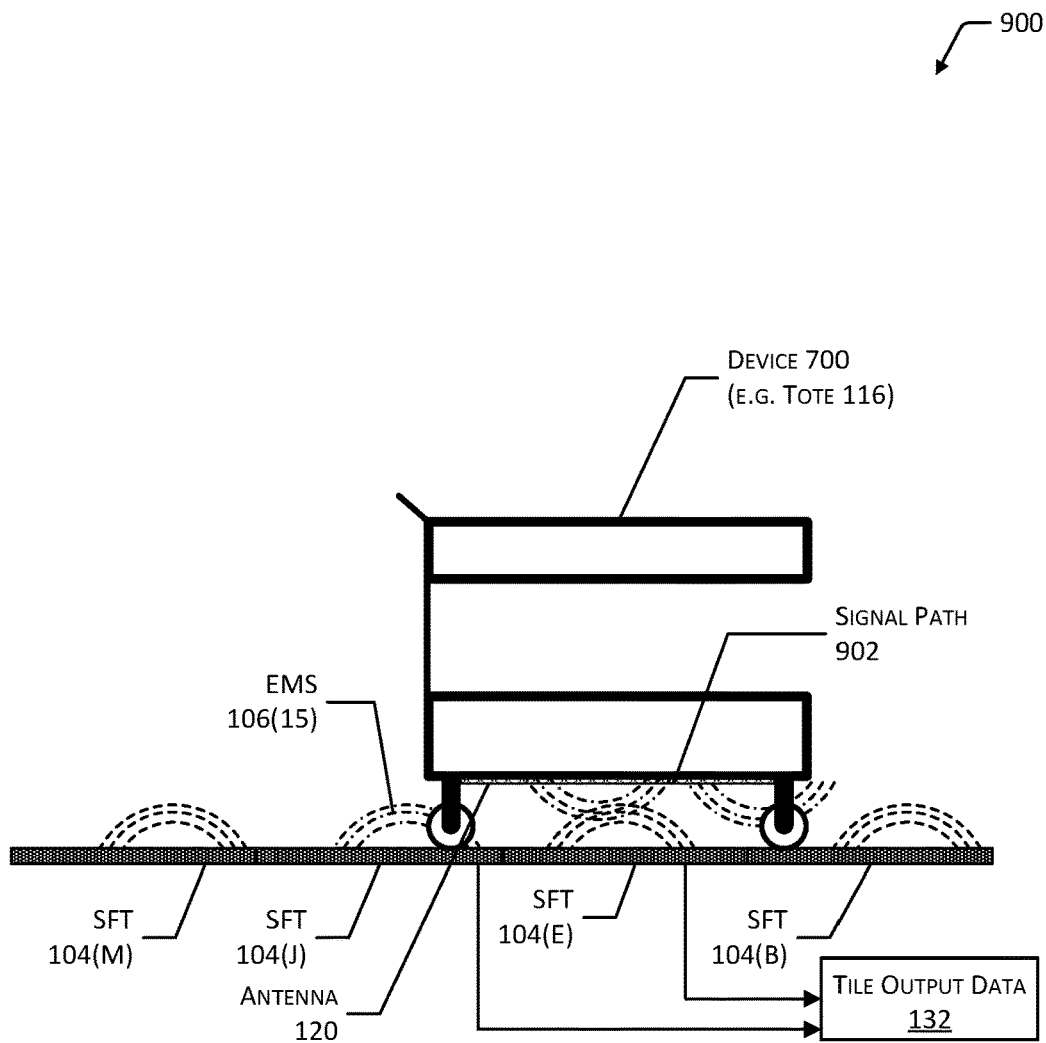
FIG. 9 illustrates another side view of a passive moveable device that may be tracked by the smart floor and orientation determined, according to some implementations.

FIG. 9 illustrates another side view 900 of a passive moveable device that may be tracked by the smart floor and orientation determined, according to some implementations.

In some implementations the antennas 120 may be used in a passive mode. As described above, the SFT 104 generates EMS 106. In this illustration, the antenna 120 extends from the front to the back of the device 700. Due to the capacitive coupling between SFT 104 and the antenna 120, the antenna 120 acts as a signal path 902 and serves to propagate an EMS 106 from one SFT 104 (or segment 204) to another. For example, the EMS 106(15) emitted by the SFT 104(J) is propagated to SFT 104(B) where it is received. As a result, tile output data 132 may be generated by the respective SFTs 104 that is indicative of this propagation.

In some implementations, at least a portion of the structure 802 may be utilized as antennas 120. For example, the bottom of the tote 116 may be metal mesh that acts as an antenna 120.

The antennas 120 may be arranged in one or more asymmetrical patterns or shapes. The size and shape of the antennas 120 as determined using the tile output data 132 may be used to determine the orientation data 144.

Passive and active modes may be utilized concurrently. For example, in addition to the electronics 706 generating or receiving EMS 106, the antenna 120 may propagate the signal from one SFT 104 to another.

Figure 10:
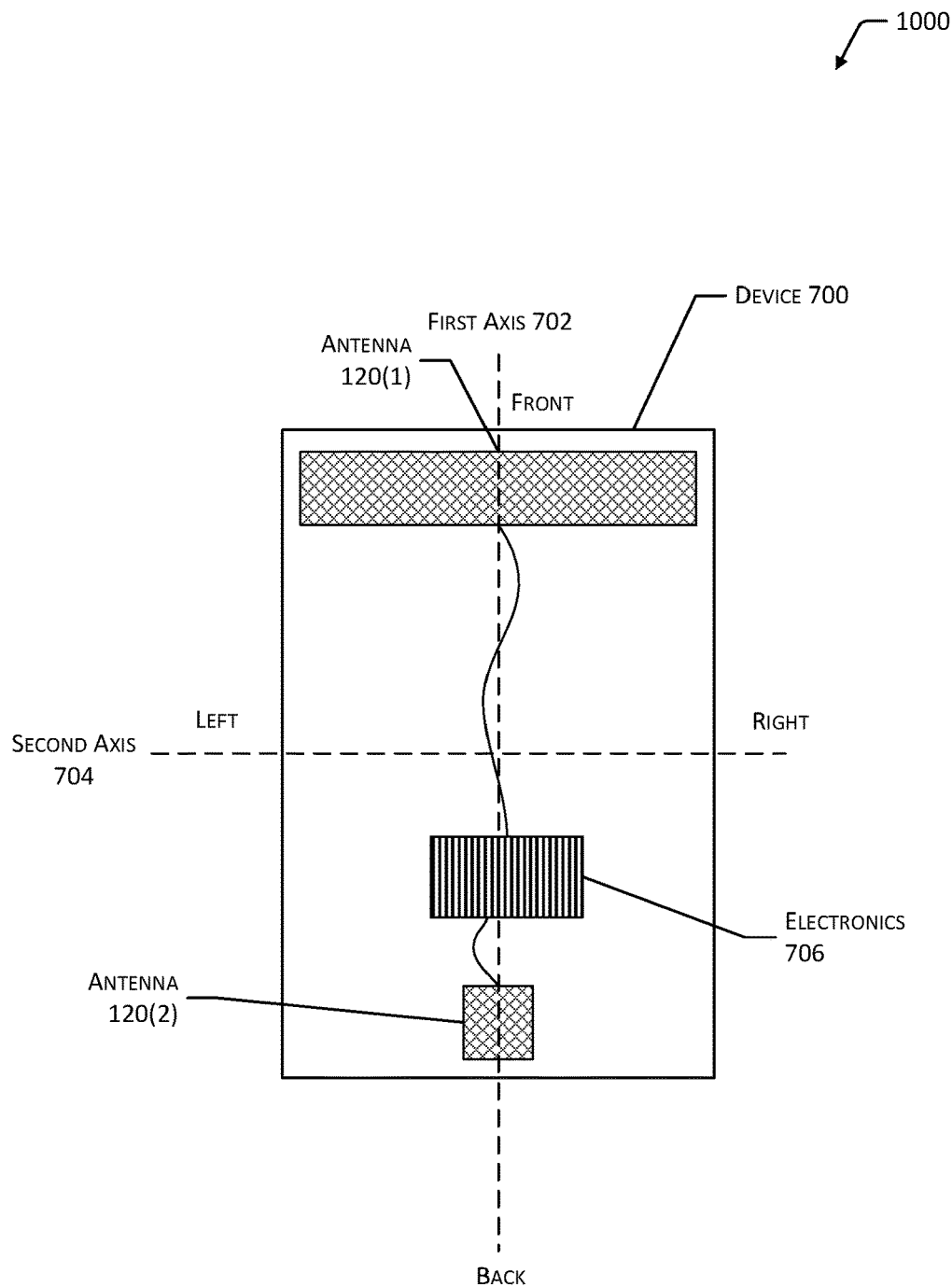
FIG. 10 illustrates a view of an asymmetric arrangement of antennas on the moveable device that may be used by the smart floor to determine orientation of the moveable device, according to some implementations.
Figure 10:
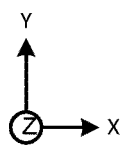

FIG. 10 illustrates a view 1000 of an asymmetric arrangement of antennas 120 on the moveable device 700 that may be used by the smart floor 102 to determine orientation of the moveable device 700, according to some implementations.

In this example, a first antenna 120(1) comprises a rectangle arranged at a front of the device 700. A long axis of this first antenna 120(1) extends from a left side to a right side of the device 700. A second antenna 120(2) is square and arranged at a back of the device 700, centered on the midline of the device 700. The surface area of the first antenna 120(1) is greater than the surface area of the second antenna 120(2).

In this arrangement, there is symmetry with respect to the first axis 702 but asymmetry with respect to the second axis 704. Given the device configuration data 140 provides information about the relative placement and size of the antennas 120, the orientation 118 of the device 700 may be determined.

The antennas 120 are depicted as being connected to electronics 706. In some implementations this asymmetric arrangement may be used in a passive system, such as described in FIG. 9.

Figure 11:
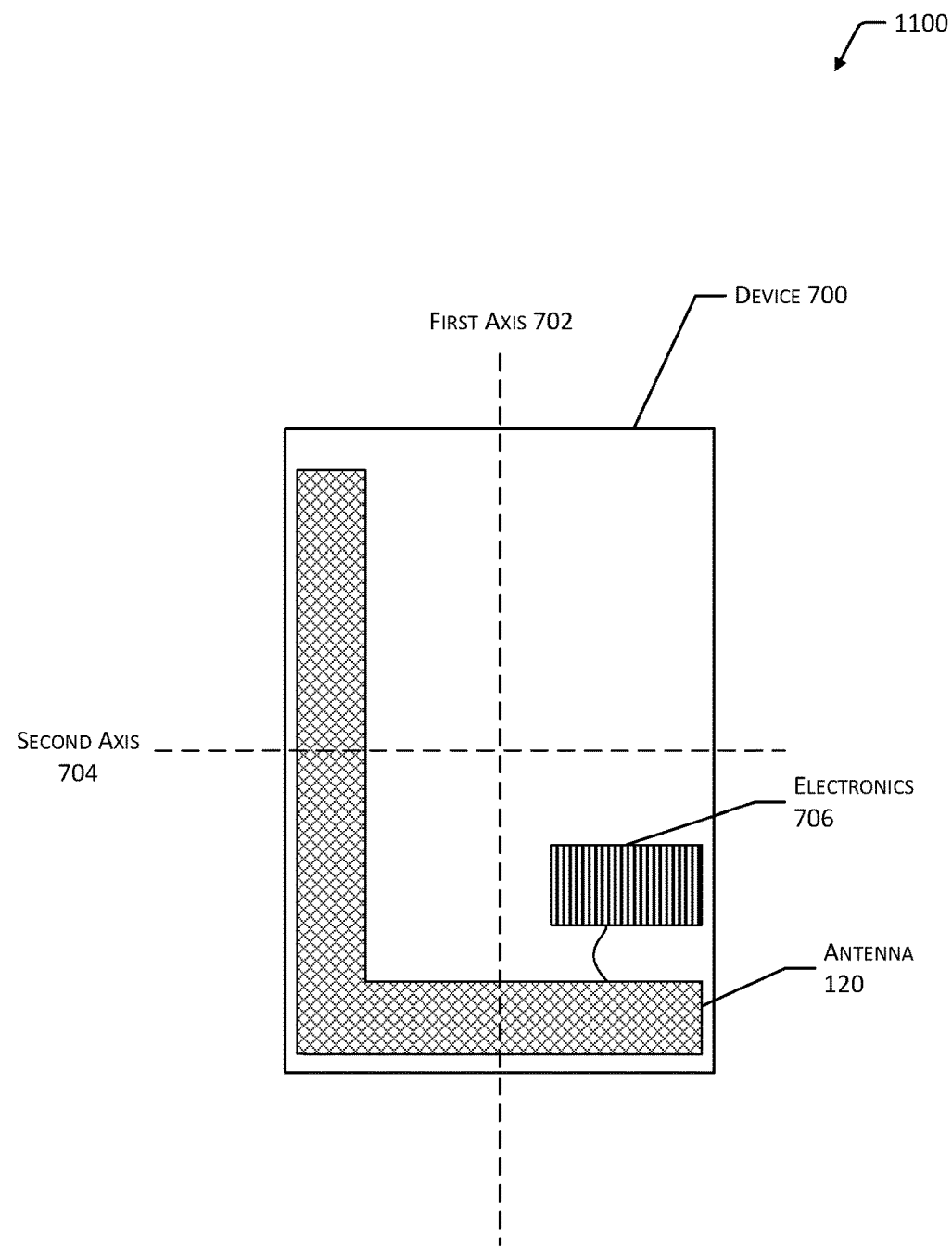
FIG. 11 illustrates a view of a single asymmetric antenna that may be used by the smart floor to determine orientation of the moveable device, according to some implementations.

FIG. 11 illustrates a view 1100 of a single asymmetric antenna that may be used by the smart floor 102 to determine orientation of the moveable device 700, according to some implementations.

In this illustration, a single antenna 120 is depicted extending along two adjacent sides of a perimeter of the device 700, forming an "L" shape. This antenna 120 may be used with the electronics 706, or may be operated in a passive mode.

Figure 12:
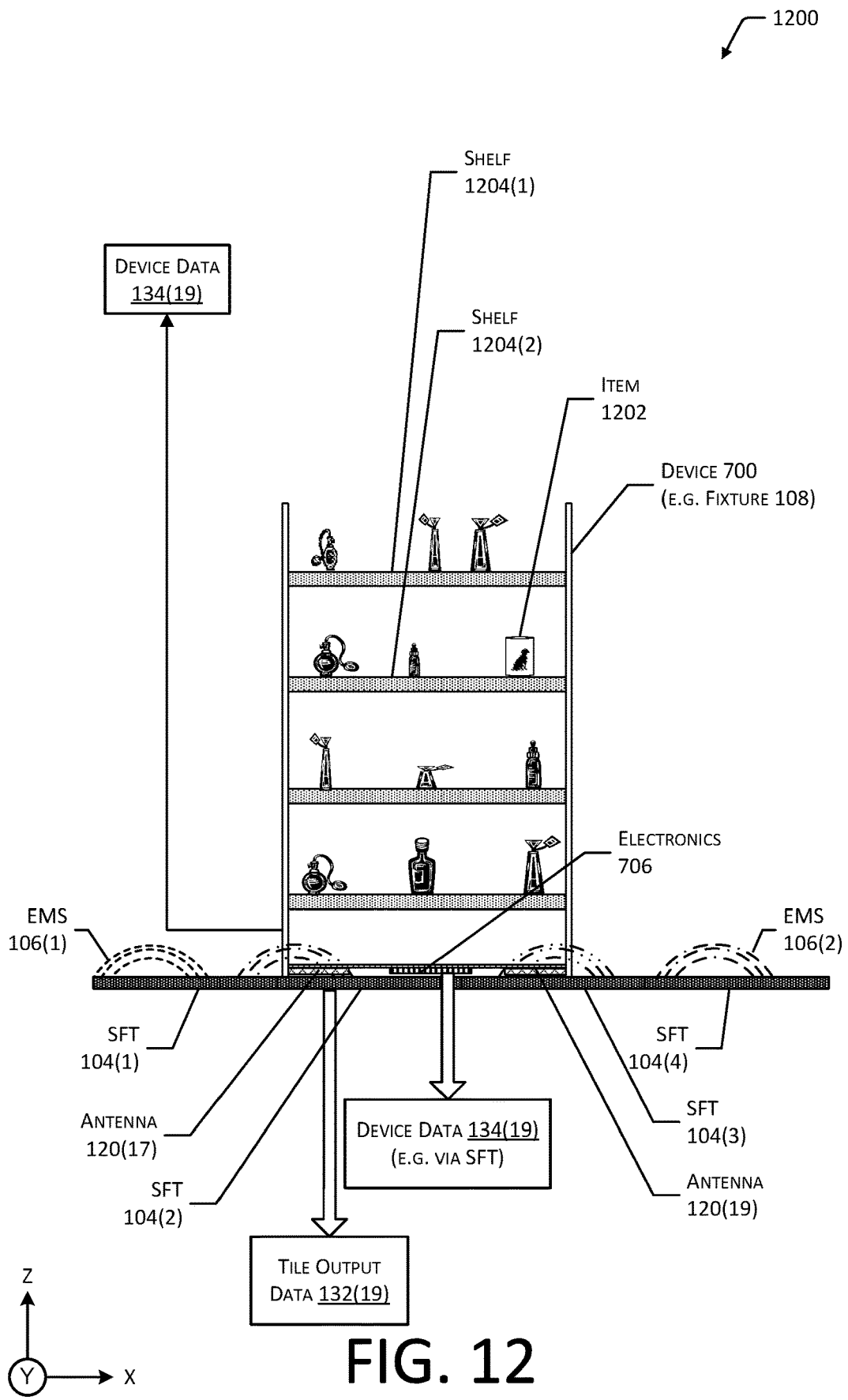
FIG. 12 illustrates a view of a moveable device such as a rack of shelves that may be tracked using the techniques described herein, according to some implementations.

FIG. 12 illustrates a view 1200 of a moveable device 700 such as a rack of shelves that may be tracked using the techniques described herein, according to some implementations. In this illustration, items 1202 are supported by a plurality of shelves 1204. For example, a portable display unit may include the antennas 120 and electronics 706 to facilitate determination of the location within the facility and orientation data 144. The device 700 may be configured to generate device data 134 as described above. In some implementations, the device 700 such as the rack of shelves may be removably affixed to a floor, ceiling, wall, or other structure. For example, the device 700 may comprise modular furniture that may be unbolted and repositioned.

Figure 13:
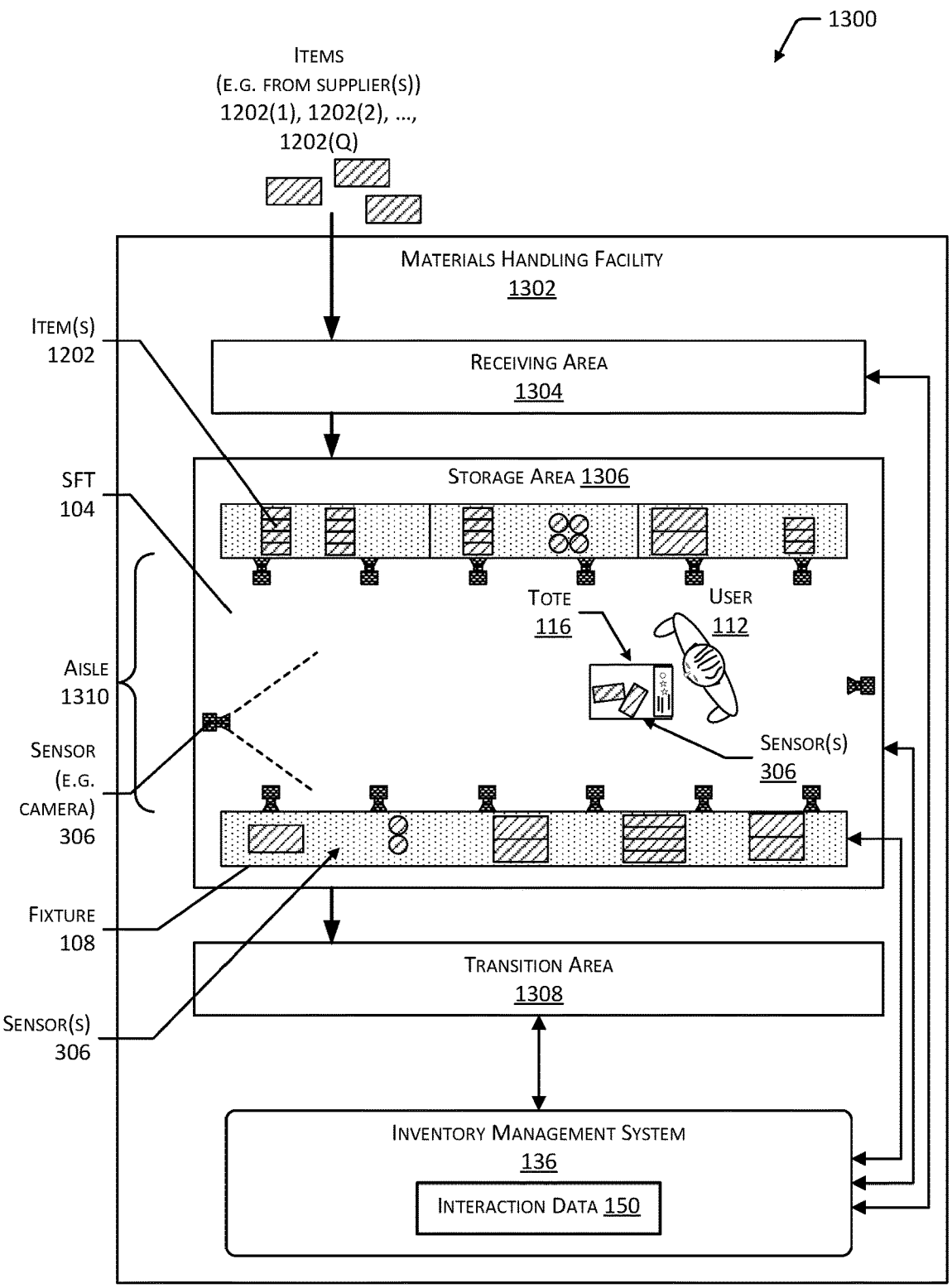
FIG. 13 is a block diagram illustrating a materials handling facility (facility) using the system, according to some implementations.

FIG. 13 is a block diagram 1300 illustrating a materials handling facility (facility) using the system 100, according to some implementations. A facility 1302 comprises one or more physical structures or areas within which one or more items 1202(1), 1202(2), . . . , 1202(Q) may be held. The items 1202 may comprise physical goods, such as books, pharmaceuticals, repair parts, electronic gear, and so forth.

The facility 1302 may include one or more areas designated for different functions with regard to inventory handling. In this illustration, the facility 1302 includes a receiving area 1304, a storage area 1306, and a transition area 1308. Throughout the facility 1320, the plurality of SFTs 104 may be deployed as described above.

The receiving area 1304 may be configured to accept items 1202, such as from suppliers, for intake into the facility 1302. For example, the receiving area 1304 may include a loading dock at which trucks or other freight conveyances unload the items 1202. The trucks or other freight conveyances may be equipped in a fashion similar to the device 700. In some implementations, the items 1202 may be processed, such as at the receiving area 1304, to generate at least a portion of item data as described below. For example, an item 1202 may be tested at the receiving area 1304 to determine the attenuation of an EMS 106 passing through it, and this information stored as item data.

The storage area 1306 is configured to store the items 1202. The storage area 1306 may be arranged in various physical configurations. In one implementation, the storage area 1306 may include one or more aisles 1310. The aisle 1310 may be configured with, or defined by, the fixtures 108 on one or both sides of the aisle 1310. The fixtures 108 may include one or more of a shelf 1204, a rack, a case, a cabinet, a bin, a floor location, or other suitable storage mechanisms for holding, supporting, or storing the items 1202. For example, the fixtures 108 may comprise shelves 1204 with lanes designated therein. The fixtures 108 may be affixed to the floor 102 or another portion of the structure of the facility 1302. The fixtures 108 may also be movable such that the arrangements of aisles 1310 may be reconfigurable. In some implementations, the fixtures 108 may be configured to move independently of an outside operator. For example, the fixtures 108 may comprise a rack with a power source and a motor, operable by a computing device to allow the rack to move from one location within the facility 1302 to another.

One or more users 112(1), 112(2), . . . , 112(U) and totes 116(1), 116(2), . . . , 116(T) or other material handling apparatus may move within the facility 1302. For example, the user 112 may move about within the facility 1302 to pick or place the items 1202 in various fixtures 108, placing them on the tote 116 for ease of transport. The tote 116 is configured to carry or otherwise transport one or more items 1202. For example, the tote 116 may include a basket, cart, bag, bin, and so forth. In other implementations, other material handling apparatuses such as robots, forklifts, cranes, aerial drones, and so forth, may move about the facility 1302 picking, placing, or otherwise moving the items 1202. For example, a robot may pick an item 1202 from a first fixture 108(1) and move the item 1202 to a second fixture 108(2). The material handling apparatuses may be equipped as described above with respect to the device 700 to allow for determination of orientation data 144, tracking data 146, and so forth.

One or more sensors 306 may be configured to acquire information in the facility 1302. The sensors 306 may include, but are not limited to, weight sensors 306(1), capacitive sensors 306(2), image sensors 306(3), depth sensors 306(4), and so forth. The sensors 306 may be stationary or mobile, relative to the facility 1302. For example, the fixtures 108 may contain weight sensors 306(1) to acquire weight sensor data of items 1202 stowed therein, image sensors 306(3) to acquire images of picking or placement of items 1202 on shelves 1204, optical sensor arrays 306(14) to detect shadows of the user's 112 hands at the fixtures 108, and so forth. In another example, the facility 1302 may include image sensors 306(3) to obtain images of the user 112 or other objects in the facility 1302. The sensors 306 are discussed in more detail below with regard to FIG. 14.

While the storage area 1306 is depicted as having one or more aisles 1310, fixtures 108 storing the items 1202, sensors 306, and so forth, it is understood that the receiving area 1304, the transition area 1308, or other areas of the facility 1302 may be similarly equipped. Furthermore, the arrangement of the various areas within the facility 1302 is depicted functionally rather than schematically. For example, in some implementations, multiple different receiving areas 1304, storage areas 1306, and transition areas 1308 may be interspersed rather than segregated in the facility 1302.

The facility 1302 may include, or be coupled to, the inventory management system 136. The inventory management system 136 is configured to interact with one or more of the users 112 or devices such as sensors 306, robots, material handling equipment, computing devices, and so forth, in one or more of the receiving area 1304, the storage area 1306, or the transition area 1308.

During operation of the facility 1302, the sensors 306 may be configured to provide sensor data, or information based on the sensor data, to the inventory management system 136. The sensor data may include weight data, capacitance data, image data, and so forth. The sensors 306 are described in more detail below with regard to FIG. 14.

The inventory management system 136 or other systems may use the sensor data to track the location of objects within the facility 1302, movement of the objects, or provide other functionality. Objects may include, but are not limited to, items 1202, users 112, totes 116, devices, and so forth.

For example, a series of images acquired by the image sensor 306(3) may indicate removal by the user 112 of an item 1202 from a particular location on the fixture 108 and placement of the item 1202 on or at least partially within the tote 116.

The facility 1302 may be configured to receive different kinds of items 1202 from various suppliers and to store them until a customer orders or retrieves one or more of the items 1202. A general flow of items 1202 through the facility 1302 is indicated by the arrows of FIG. 13. Specifically, as illustrated in this example, items 1202 may be received from one or more suppliers, such as manufacturers, distributors, wholesalers, and so forth, at the receiving area 1304. In various implementations, the items 1202 may include merchandise, commodities, perishables, or any suitable type of item 1202, depending on the nature of the enterprise that operates the facility 1302.

Upon being received from a supplier at the receiving area 1304, the items 1202 may be prepared for storage in the storage area 1306. For example, in some implementations, items 1202 may be unpacked or otherwise rearranged. The inventory management system 136 may include one or more software applications executing on a computer system to provide inventory management functions. These inventory management functions may include maintaining information indicative of the type, quantity, condition, cost, location, weight, or any other suitable parameters with respect to the items 1202. The items 1202 may be stocked, managed, or dispensed in terms of countable units, individual units, or multiple units, such as packages, cartons, crates, pallets, or other suitable aggregations. Alternatively, some items 1202, such as bulk products, commodities, and so forth, may be stored in continuous or arbitrarily divisible amounts that may not be inherently organized into countable units. Such items 1202 may be managed in terms of a measurable quantity such as units of length, area, volume, weight, time, duration, or other dimensional properties characterized by units of measurement. Generally speaking, a quantity of an item 1202 may refer to either a countable number of individual or aggregate units of an item 1202 or a measurable amount of an item 1202, as appropriate.

After arriving through the receiving area 1304, items 1202 may be stored within the storage area 1306. In some implementations, like items 1202 may be stored or displayed together in the fixtures 108 such as in bins, on shelves 1204, hanging from pegboards, and so forth. For example, all items 1202 of a given kind are stored in one fixture 108. In other implementations, like items 1202 may be stored in different fixtures 108. For example, to optimize retrieval of certain items 1202 having frequent turnover within a large physical facility 1302, those items 1202 may be stored in several different fixtures 108 to reduce congestion that might occur at a single fixture 108.

When a customer order specifying one or more items 1202 is received, or as a user 112 progresses through the facility 1302, the corresponding items 1202 may be selected or "picked" from the fixtures 108 containing those items 1202. In various implementations, item picking may range from manual to completely automated picking. For example, in one implementation, a user 112 may have a list of items 1202 they desire and may progress through the facility 1302 picking items 1202 from the fixtures 108 within the storage area 1306 and placing those items 1202 into a tote 116. In other implementations, employees of the facility 1302 may pick items 1202 using written or electronic pick lists derived from customer orders. These picked items 1202 may be placed into the tote 116 as the employee progresses through the facility 1302.

After items 1202 have been picked, the items 1202 may be processed at a transition area 1308. The transition area 1308 may be any designated area within the facility 1302 where items 1202 are transitioned from one location to another or from one entity to another. For example, the transition area 1308 may be a packing station within the facility 1302. When the item 1202 arrives at the transition area 1308, the items 1202 may be transitioned from the storage area 1306 to the packing station. Information about the transition may be maintained by the inventory management system 136.

In another example, if the items 1202 are departing the facility 1302, a list of the items 1202 may be obtained and used by the inventory management system 136 to transition responsibility for, or custody of, the items 1202 from the facility 1302 to another entity. For example, a carrier may accept the items 1202 for transport with that carrier accepting responsibility for the items 1202 indicated in the list. In another example, a user 112 may purchase or rent the items 1202 and remove the items 1202 from the facility 1302. During use of the facility 1302, the user 112 may move about the facility 1302 to perform various tasks, such as picking or placing the items 1202 in the fixtures 108.

The inventory management system 136 may generate the interaction data 150. The interaction data 150 may be based at least in part on one or more of the tile output data 132, the device data 134, and so forth. The interaction data 150 may provide information about an interaction, such as a pick of an item 1202 from the fixture 108, a place of an item 1202 to the fixture 108, a touch made to an item 1202 at the fixture 108, a gesture associated with an item 1202 at the fixture 108, and so forth. The interaction data 150 may include one or more of the type of interaction, duration of interaction, interaction location identifier indicative of where from the fixture 108 the interaction took place, item identifier, quantity change to the item 1202, user identifier, and so forth. The interaction data 150 may then be used to further update the item data. For example, the quantity of items 1202 on hand at a particular lane on the shelf 1204 may be changed based on an interaction that picks or places one or more items 1202.

The inventory management system 136 may combine or otherwise utilize data from different sensors 306 of different types. For example, weight data obtained from weight sensors 306(1) at the fixture 108 may be used instead of, or in conjunction with, one or more of the capacitance data to determine the interaction data 150.

Figure 14:
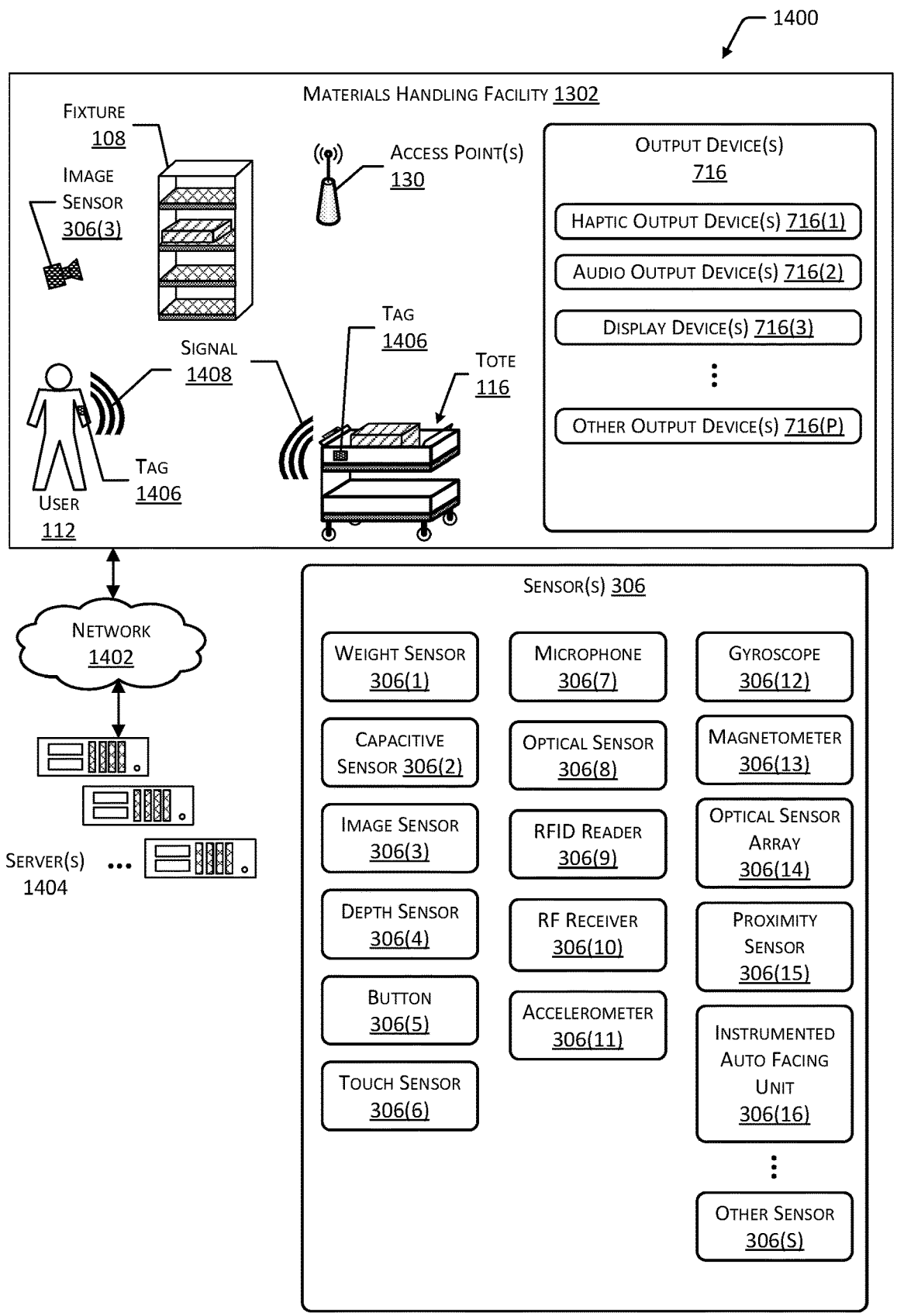
FIG. 14 is a block diagram illustrating additional details of the facility, according to some implementations.

FIG. 14 is a block diagram 1400 illustrating additional details of the facility 1302, according to some implementations. The facility 1302 may be connected to one or more networks 1402, which in turn connect to one or more servers 1404. The network 1402 may include private networks such as an institutional or personal intranet, public networks such as the Internet, or a combination thereof. The network 1402 may utilize wired technologies (e.g., wires, fiber optic cables, and so forth), wireless technologies (e.g., radio frequency, infrared, acoustic, optical, and so forth), or other connection technologies. The network 1402 is representative of any type of communication network, including one or more of data networks or voice networks. The network 1402 may be implemented using wired infrastructure (e.g., copper cable, fiber optic cable, and so forth), a wireless infrastructure (e.g., cellular, microwave, satellite, and so forth), or other connection technologies.

The servers 1404 may be configured to execute one or more modules or software applications associated with the inventory management system 136 or other systems. While the servers 1404 are illustrated as being in a location outside of the facility 1302, in other implementations, at least a portion of the servers 1404 may be located at the facility 1302. The servers 1404 are discussed in more detail below with regard to FIG. 15.

The users 112, the totes 116, or other objects in the facility 1302 may be equipped with one or more tags 1406. The tags 1406 may be configured to emit a signal 1408. In one implementation, the tag 1406 may be a radio-frequency identification (RFID) tag 1406 configured to emit a RF signal 1408 upon activation by an external signal. For example, the external signal may comprise a radio frequency signal or a magnetic field configured to energize or activate the RFID tag 1406. In another implementation, the tag 1406 may comprise a transmitter and a power source configured to power the transmitter. For example, the tag 1406 may comprise a Bluetooth Low Energy (BLE) transmitter and battery. In other implementations, the tag 1406 may use other techniques to indicate presence of the tag 1406. For example, an acoustic tag 1406 may be configured to generate an ultrasonic signal 1408, which is detected by corresponding acoustic receivers. In yet another implementation, the tag 1406 may be configured to emit an optical signal 1408.

The inventory management system 136 may be configured to use the tags 1406 for one or more of identification of the object, determining a location of the object, and so forth. For example, the users 112 may wear tags 1406, the totes 116 may have tags 1406 affixed, and so forth, which may be read and, based at least in part on signal strength, used to determine identity and location. In other implementations, such as described above, the users 112 may wear portable transmitters, the totes 116 may be equipped with a portable receiver, portable transmitter, and so forth. In some implementations, the two may be combined, such as tags 1406 and the use of a portable transmitter.

Generally, the inventory management system 136 or other systems associated with the facility 1302 may include any number and combination of input components, output components, and servers 1404.

The one or more sensors 306 may be arranged at one or more locations within the facility 1302. For example, the sensors 306 may be mounted on or within a floor 102, wall, at a ceiling, at fixture 108, on a tote 116, may be carried or worn by a user 112, and so forth.

The sensors 306 may include one or more weight sensors 306(1) that are configured to measure the weight of a load, such as the item 1202, the tote 116, or other objects. The weight sensors 306(1) may be configured to measure the weight of the load at one or more of the fixtures 108, the tote 116, on the floor 102 of the facility 1302, and so forth. For example, the shelf 1204 may include a plurality of lanes or platforms, with one or more weight sensors 306(1) beneath each one to provide weight sensor data about an individual lane or platform. The weight sensors 306(1) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 306(1) may operate as transducers that generate one or more signals based on an applied force, such as that of the load due to gravity. For example, the weight sensor 306(1) may comprise a load cell having a strain gauge and a structural member that deforms slightly when weight is applied. By measuring a change in the electrical characteristic of the strain gauge, such as capacitance or resistance, the weight may be determined. In another example, the weight sensor 306(1) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 136 may use the data acquired by the weight sensors 306(1) to identify an object, determine a change in the quantity of objects, determine a location of an object, maintain shipping records, and so forth.

The sensors 306 may include capacitive sensors 306(2). The capacitive sensor 306(2) may comprise one or more conductive elements and the capacitance measurement/receiver module. In some implementations, the capacitive sensor 306(2) may include or utilize a switch module. The capacitive sensor 306(2) may be configured to use a far-field capacitance effect that may comprise measuring the self-capacitance of the conductive elements, rather than a mutual capacitance. In one implementation, a fixed charge may be provided to the conductive element, and the resultant voltage may be measured between the conductive element and the ground.

In other implementations, the capacitive sensor 306(2) may be configured to operate in a mutual capacitance mode, surface capacitance mode, and so forth. In mutual capacitance mode, at least two conductive layers are arranged in a stack with a dielectric material between the layers. The dielectric material may be a solid, such as a plastic, a gas such as air, a vacuum, and so forth. The mutual capacitance at points between these layers is measured. When another object touches the outermost conductive layer, the mutual capacitance between the two layer changes, allowing for detection. In surface capacitance mode, voltages are applied to different points of a conductive element to produce an electrostatic field. By measuring the changes in current draw (or another electrical characteristic) from the different points at which voltage is applied, a location of an object may be determined.

The sensors 306 may include one or more image sensors 306(3). The one or more image sensors 306(3) may include imaging sensors configured to acquire images of a scene. The image sensors 306(3) are configured to detect light in one or more wavelengths including, but not limited to, terahertz, infrared, visible, ultraviolet, and so forth. The image sensors 306(3) may comprise charge coupled devices (CCD), complementary metal oxide semiconductor (CMOS) devices, microbolometers, and so forth. The inventory management system 136 may use image data acquired by the image sensors 306(3) during operation of the facility 1302. For example, the inventory management system 136 may identify items 1202, users 112, totes 116, and so forth, based at least in part on their appearance within the image data acquired by the image sensors 306(3). The image sensors 306(3) may be mounted in various locations within the facility 1302. For example, image sensors 306(3) may be mounted overhead, on the fixtures 108, may be worn or carried by users 112, may be affixed to totes 116, and so forth.

One or more depth sensors 306(4) may also be included in the sensors 306. The depth sensors 306(4) are configured to acquire spatial or three-dimensional (3D) data, such as depth information, about objects within a FOV. The depth sensors 306(4) may include range cameras, lidar systems, sonar systems, radar systems, structured light systems, stereo vision systems, optical interferometry systems, and so forth. The inventory management system 136 may use the 3D data acquired by the depth sensors 306(4) to identify objects, determine a location of an object in 3D real space, and so forth.

One or more buttons 306(5) may be configured to accept input from the user 112. The buttons 306(5) may comprise mechanical, capacitive, optical, or other mechanisms. For example, the buttons 306(5) may comprise mechanical switches configured to accept an applied force from a touch of the user 112 to generate an input signal. The inventory management system 136 may use data from the buttons 306(5) to receive information from the user 112. For example, the tote 116 may be configured with a button 306(5) to accept input from the user 112 and send information indicative of the input to the inventory management system 136.

The sensors 306 may include one or more touch sensors 306(6). The touch sensors 306(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 136 may use data from the touch sensors 306(6) to receive information from the user 112. For example, the touch sensor 306(6) may be integrated with the tote 116 to provide a touchscreen with which the user 112 may select from a menu one or more particular items 1202 for picking, enter a manual count of items 1202 at fixture 108, and so forth.

One or more microphones 306(7) may be configured to acquire information indicative of sound present in the environment. In some implementations, arrays of microphones 306(7) may be used. These arrays may implement beamforming techniques to provide for directionality of gain. The inventory management system 136 may use the one or more microphones 306(7) to acquire information from acoustic tags 1406, accept voice input from the users 112, determine ambient noise level, and so forth.

The sensors 306 may include one or more optical sensors 306(8). The optical sensors 306(8) may be configured to provide data indicative of one or more of color or intensity of light impinging thereupon. For example, the optical sensor 306(8) may comprise a photodiode and associated circuitry configured to generate a signal or data indicative of an incident flux of photons. As described below, the optical sensor array 306(14) may comprise a plurality of the optical sensors 306(8). For example, the optical sensor array 306(14) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 306(8) may be used. The optical sensors 306(8) may be sensitive to one or more of infrared light, visible light, or ultraviolet light. For example, the optical sensors 306(8) may be sensitive to infrared light, and infrared light sources such as light emitting diodes (LEDs) may provide illumination.

The optical sensors 306(8) may include photodiodes, photoresistors, photovoltaic cells, quantum dot photoconductors, bolometers, pyroelectric infrared detectors, and so forth. For example, the optical sensor 306(8) may use germanium photodiodes to detect infrared light.

One or more radio frequency identification (RFID) readers 306(9), near field communication (NFC) systems, and so forth, may be included as sensors 306. For example, the RFID readers 306(9) may be configured to read the RF tags 1406. Information acquired by the RFID reader 306(9) may be used by the inventory management system 136 to identify an object associated with the RF tag 1406 such as the item 1202, the user 112, the tote 116, and so forth. For example, based on information from the RFID readers 306(9) detecting the RF tag 1406 at different times and RFID readers 306(9) having different locations in the facility 1302, a velocity of the RF tag 1406 may be determined.

One or more RF receivers 306(10) may also be included as sensors 306. In some implementations, the RF receivers 306(10) may be part of transceiver assemblies. The RF receivers 306(10) may be configured to acquire RF signals 1408 associated with Wi-Fi, Bluetooth, ZigBee, 4G, 3G, LTE, or other wireless data transmission technologies. The RF receivers 306(10) may provide information associated with data transmitted via radio frequencies, signal strength of RF signals 1408, and so forth. For example, information from the RF receivers 306(10) may be used by the inventory management system 136 to determine a location of an RF source, such as a communication interface onboard the tote 116.

The sensors 306 may include one or more accelerometers 306(11), which may be worn or carried by the user 112, mounted to the tote 116, and so forth. The accelerometers 306(11) may provide information such as the direction and magnitude of an imposed acceleration. Data such as rate of acceleration, determination of changes in direction, speed, and so forth, may be determined using the accelerometers 306(11).

A gyroscope 306(12) may provide information indicative of rotation of an object affixed thereto. For example, the tote 116 or other objects may be equipped with a gyroscope 306(12) to provide data indicative of a change in orientation of the object.

A magnetometer 306(13) may be used to determine an orientation by measuring ambient magnetic fields, such as the terrestrial magnetic field. The magnetometer 306(13) may be worn or carried by the user 112, mounted to the tote 116, and so forth. For example, the magnetometer 306(13) mounted to the tote 116 may act as a compass and provide information indicative of which direction the tote 116 is oriented.

An optical sensor array 306(14) may comprise one or more optical sensors 306(8). The optical sensors 306(8) may be arranged in a regular, repeating, or periodic two-dimensional arrangement such as a grid. The optical sensor array 306(14) may generate image data. For example, the optical sensor array 306(14) may be arranged within or below fixture 108 and obtain information about shadows of items 1202, hand of the user 112, and so forth.

The sensors 306 may include proximity sensors 306(15) used to determine presence of an object, such as the user 112, the tote 116, and so forth. The proximity sensors 306(15) may use optical, electrical, ultrasonic, electromagnetic, or other techniques to determine a presence of an object. In some implementations, the proximity sensors 306(15) may use an optical emitter and an optical detector to determine proximity. For example, an optical emitter may emit light, a portion of which may then be reflected by the object back to the optical detector to provide an indication that the object is proximate to the proximity sensor 306(15). In other implementations, the proximity sensors 306(15) may comprise a capacitive proximity sensor 306(15) configured to provide an electrical field and determine a change in electrical capacitance due to presence or absence of an object within the electrical field.

The proximity sensors 306(15) may be configured to provide sensor data indicative of one or more of a presence or absence of an object, a distance to the object, or characteristics of the object. An optical proximity sensor 306(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 306 such as an image sensor 306(3). Based on an apparent distance between the features of the structured light pattern, the distance to the object may be calculated. Other techniques may also be used to determine distance to the object. In another example, the color of the reflected light may be used to characterize the object, such as skin, clothing, tote 116, and so forth.

The sensors 306 may also include an instrumented auto-facing unit (IAFU) 306(16). The IAFU 306(16) may comprise a position sensor configured to provide data indicative of displacement of a pusher. As an item 1202 is removed from the IAFU 306(16), the pusher moves, such as under the influence of a spring, and pushes the remaining items 1202 in the IAFU 306(16) to the front of the fixture 108. By using data from the position sensor, and given item data such as a depth of an individual item 1202, a count may be determined, based on a change in position data. For example, if each item 1202 is 1 inch deep, and the position data indicates a change of 17 inches, the quantity held by the IAFU 306(16) may have changed by 17 items 1202. This count information may be used to confirm or provide a cross check for a count obtained by other means, such as analysis of the weight data, the capacitance data, the image data, and so forth.

The sensors 306 may include other sensors 306(S) as well. For example, the other sensors 306(S) may include light curtains, ultrasonic rangefinders, thermometers, barometric sensors, air pressure sensors, hygrometers, and so forth. For example, the inventory management system 136 may use information acquired from thermometers and hygrometers in the facility 1302 to direct the user 112 to check on delicate items 1202 stored in a particular fixture 108, which is overheating, too dry, too damp, and so forth.

In one implementation, a light curtain may utilize a linear array of light emitters and a corresponding linear array of light detectors. For example, the light emitters may comprise a line of infrared LEDs or vertical cavity surface emitting lasers (VCSELs) that are arranged in front of the fixture 108, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 112 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 112 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 112 may be used to generate interaction data 150.

In some implementations, the image sensor 306(3) or other sensors 306(S) may include hardware processors, memory, and other elements configured to perform various functions. For example, the image sensors 306(3) may be configured to generate image data, send the image data to another device such as the server 1404, and so forth.

The facility 1302 may include one or more access points 130 configured to establish one or more wireless networks. The access points 130 may use Wi-Fi, NFC, Bluetooth, or other technologies to establish wireless communications between a device and the network 1402. The wireless networks allow devices to communicate with one or more of the sensors 306, the inventory management system 136, the optical sensor arrays 306(14), the tag 1406, a communication device of the tote 116, or other devices.

Output devices 716 may also be provided in the facility 1302. The output devices 716 are configured to generate signals, which may be perceived by the user 112 or detected by the sensors 306. In some implementations, the output devices 716 may be used to provide illumination of the optical sensor array 306(14).

Haptic output devices 716(1) are configured to provide a signal that results in a tactile sensation to the user 112. The haptic output devices 716(1) may use one or more mechanisms such as electrical stimulation or mechanical displacement to provide the signal. For example, the haptic output devices 716(1) may be configured to generate a modulated electrical signal, which produces an apparent tactile sensation in one or more fingers of the user 112. In another example, the haptic output devices 716(1) may comprise piezoelectric or rotary motor devices configured to provide a vibration, which may be felt by the user 112.

One or more audio output devices 716(2) may be configured to provide acoustic output. The acoustic output includes one or more of infrasonic sound, audible sound, or ultrasonic sound. The audio output devices 716(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 716(3) may be configured to provide output, which may be seen by the user 112 or detected by a light-sensitive sensor such as an image sensor 306(3) or an optical sensor 306(8). In some implementations, the display devices 716(3) may be configured to produce output in one or more of infrared, visible, or ultraviolet light. The output may be monochrome or in color. The display devices 716(3) may be one or more of emissive, reflective, microelectromechanical, and so forth. An emissive display device 716(3), such as using LEDs, is configured to emit light during operation. In comparison, a reflective display device 716(3), such as using an electrophoretic element, relies on ambient light to present an image. Backlights or front lights may be used to illuminate non-emissive display devices 716(3) to provide visibility of the output in conditions where the ambient light levels are low.

The display devices 716(3) may be located at various points within the facility 1302. For example, the addressable displays may be located on the fixtures 108, totes 116, on the floor of the facility 1302, and so forth.

Other output devices 716(P) may also be present. For example, the other output devices 716(P) may include scent/odor dispensers, document printers, 3D printers or fabrication equipment, and so forth.

Figure 15:
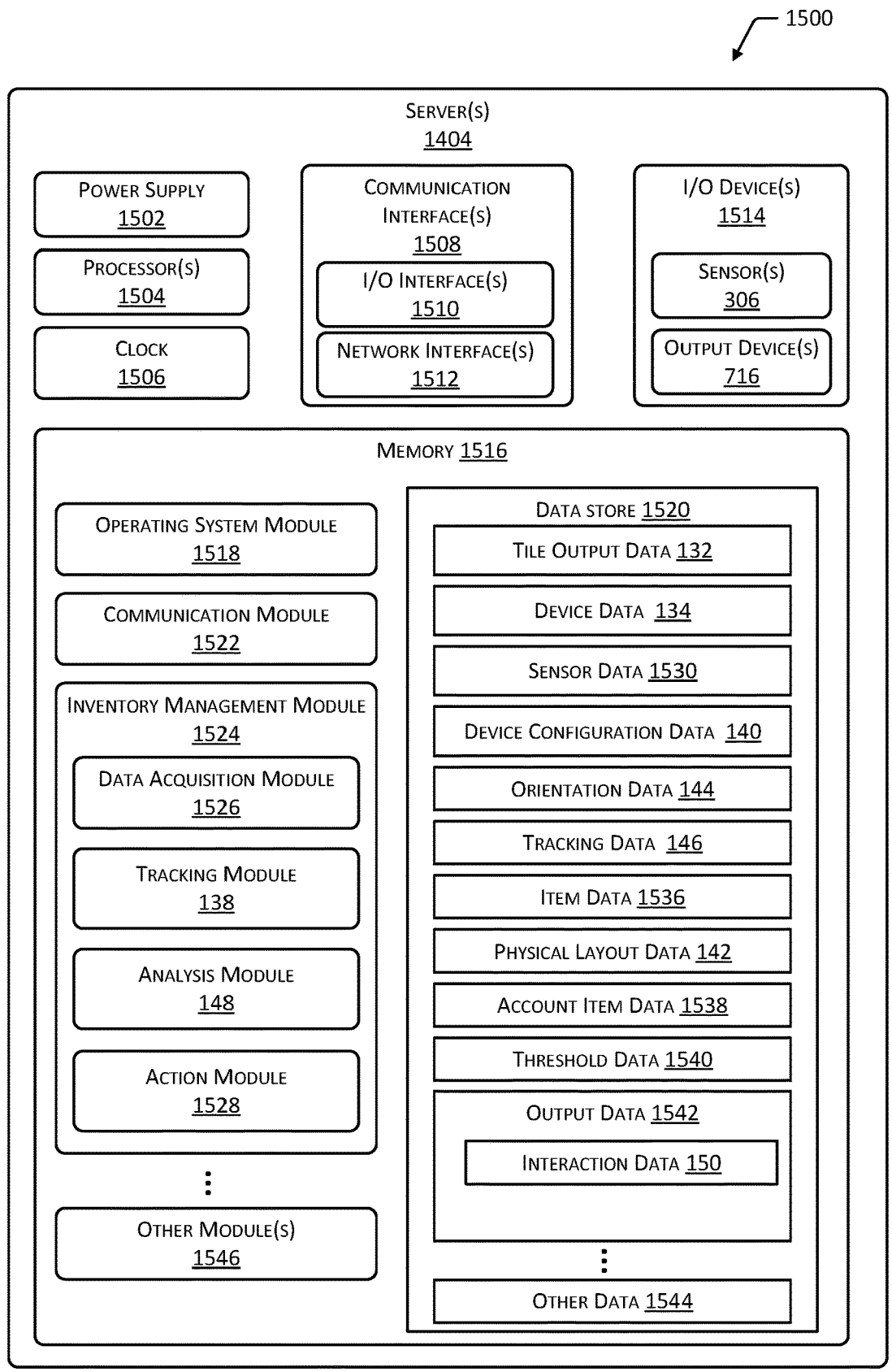
FIG. 15 is a block diagram of a server to support operation of the facility, according to some implementations.

FIG. 15 illustrates a block diagram 1500 of a server 1404 configured to support operation of the facility 1302, according to some implementations. The server 1404 may be physically present at the facility 1302, may be accessible by the network 1402, or a combination of both. The server 1404 does not require end-user knowledge of the physical location and configuration of the system that delivers the services. Common expressions associated with the server 1404 may include "on-demand computing", "software as a service (SaaS)", "platform computing", "network-accessible platform", "cloud services", "data centers", and so forth. Services provided by the server 1404 may be distributed across one or more physical or virtual devices.

One or more power supplies 1502 may be configured to provide electrical power suitable for operating the components in the server 1404. The one or more power supplies 1502 may comprise batteries, capacitors, fuel cells, photovoltaic cells, wireless power receivers, conductive couplings suitable for attachment to an external power source such as provided by an electric utility, and so forth. The server 1404 may include one or more hardware processors 1504 (processors) configured to execute one or more stored instructions. The processors 1504 may comprise one or more cores. One or more clocks 1506 may provide information indicative of date, time, ticks, and so forth. For example, the processor 1504 may use data from the clock 1506 to associate a particular interaction with a particular point in time.

The server 1404 may include one or more communication interfaces 1508 such as input/output (I/O) interfaces 1510, network interfaces 1512, and so forth. The communication interfaces 1508 enable the server 1404, or components thereof, to communicate with other devices or components. The communication interfaces 1508 may include one or more I/O interfaces 1510. The I/O interfaces 1510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1510 may couple to one or more I/O devices 1514. The I/O devices 1514 may include input devices such as one or more of a sensor 306, keyboard, mouse, scanner, and so forth. The I/O devices 1514 may also include output devices 716 such as one or more of a display device 716(3), printer, audio speakers, and so forth. In some embodiments, the I/O devices 1514 may be physically incorporated with the server 1404 or may be externally placed.

The network interfaces 1512 may be configured to provide communications between the server 1404 and other devices, such as the SFTs 104, totes 116, routers, access points 130, and so forth. The network interfaces 1512 may include devices configured to couple to personal area networks (PANS), local area networks (LANs), wireless local area networks (WLANS), wide area networks (WANs), and so forth. For example, the network interfaces 1512 may include devices compatible with Ethernet, Wi-Fi, Bluetooth, ZigBee, and so forth.

The server 1404 may also include one or more busses or other internal communications hardware or software that allow for the transfer of data between the various modules and components of the server 1404.

As shown in FIG. 15, the server 1404 includes one or more memories 1516. The memory 1516 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1516 provides storage of computer-readable instructions, data structures, program modules, and other data for the operation of the server 1404. A few example functional modules are shown stored in the memory 1516, although the same functionality may alternatively be implemented in hardware, firmware, or as a system on a chip (SoC).

The memory 1516 may include at least one operating system (OS) module 1518. The OS module 1518 is configured to manage hardware resource devices such as the I/O interfaces 1510, the I/O devices 1514, the communication interfaces 1508, and provide various services to applications or modules executing on the processors 1504. The OS module 1518 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1516 may be a data store 1520 and one or more of the following modules. These modules may be executed as foreground applications, background tasks, daemons, and so forth. The data store 1520 may use a flat file, database, linked list, tree, executable code, script, or other data structure to store information. In some implementations, the data store 1520 or a portion of the data store 1520 may be distributed across one or more other devices including the servers 1404, network attached storage devices, and so forth.

A communication module 1522 may be configured to establish communications with one or more of the totes 116, sensors 306, display devices 716(3), other servers 1404, or other devices. The communications may be authenticated, encrypted, and so forth.

The memory 1516 may store an inventory management module 1524. The inventory management module 1524 is configured to provide the inventory functions as described herein with regard to the inventory management system 136. For example, the inventory management module 1524 may track items 1202 between different fixtures 108, to and from the totes 116, and so forth. The inventory management module 1524 may utilize the information in the data store 1520 or other information during operation.

The inventory management module 1524 may include one or more of a data acquisition module 1526, the tracking module 138, the analysis module 148, an action module 1528, and so forth. The data acquisition module 1526 may be configured to acquire and access information associated with operation of the facility 1302. For example, the data acquisition module 1526 may be configured to acquire tile output data 132 from the SFTs 104, device data 134 from the devices such as fixtures 108, totes 116, and so forth, sensor data 1530 from one or more sensors 306, and so forth. This data may be accessed by the other modules for use.

The device configuration data 140, orientation data 144, the tracking data 146, and so forth may be stored in the data store 1520. The data store 1520 may also store item data 1536. The item data 1536 provides information about a particular type of item 1202, including characteristics of that type of item 1202 such as physical dimensions, where that type of item 1202 is located in the facility 1302, characteristics about how the item 1202 appears, capacitance values associated with the type of item 1202, attenuation characteristics indicative of how the item attenuates an EMS 106, and so forth. For example, the item data 1536 may indicate that the type of item 1202 is "Bob's Low Fat Baked Beans, 10 oz. can" with a stock keeping unit number of "24076513". The item data 1536 may indicate the types and quantities of items 1202 that are expected to be stored at that particular fixture 108 such as in a particular lane on a shelf 1204, width and depth of that type of item 1202, weight of the item 1202 individually or in aggregate, sample images of the type of item 1202, and so forth.

The item data 1536 may include an item identifier. The item identifier may be used to distinguish one type of item 1202 from another. For example, the item identifier may include a stock keeping unit (SKU) string, Universal Product Code (UPC) number, radio frequency identification (RFID) tag data, and so forth. The items 1202 that are of the same type may be referred to by the same item identifier. For example, cans of beef flavor Brand X dog food may be represented by the item identifier value of "9811901181". In other implementations, non-fungible items 1202 may each be provided with a unique item identifier, allowing each to be distinguished from one another.

The item data 1536 may include one or more of geometry data, item weight data, sample image data, or other data. The geometry data may include information indicative of size and shape of the item 1202 in one-, two-, or three-dimensions. For example, the geometry data may include the overall shape of an item 1202, such as a cuboid, sphere, cylinder, and so forth. The geometry data may also include information such as length, width, depth, and so forth, of the item 1202. Dimensional information in the geometry data may be measured in pixels, centimeters, inches, arbitrary units, and so forth. The geometry data may be for a single item 1202, or a package, kit, or other grouping considered to be a single item 1202.

The item weight data comprises information indicative of a weight of a single item 1202, or a package, kit, or other grouping considered to be a single item 1202. The item data 1536 may include other data. For example, the other data may comprise weight distribution of the item 1202, point cloud data for the item 1202, and so forth.

The item data 1536 may include one or more fixture identifiers (IDs). The fixture ID is indicative of a particular area or volume of fixture 108 such as a shelf 1204 that is designated for stowage of the type of item 1202. For example, a single shelf 1204 may have several lanes, each with a different fixture ID. Each of the different fixture IDs may be associated with a lane having a particular area on the shelf 1204 designated for storage of a particular type of item 1202. A single type of item 1202 may be associated with a particular fixture ID, a plurality of fixture IDs may be associated with the single type of item 1202, more than one type of item 1202 may be associated with the particular fixture ID, and so forth.

The item data 1536 may also include quantity data. The quantity data may comprise a count or value indicative of a number of items 1202. The count may be a measured or an estimated value. The quantity data may be associated with a particular fixture ID, for an entire facility 1302, and so forth. For example, the same type of item 1202 may be stored at different shelves 1204 within the facility 1302. The quantity data may indicate the quantity on hand for each of the different fixtures 108.

The tracking module 138 may access physical layout data 142 during operation. The physical layout data 142 may provide information indicative of location of the SFTs 104, where sensors 306 and the fixtures 108 are in the facility 1302 with respect to one another, FOV of sensors 306 relative to the fixture 108, and so forth. For example, the physical layout data 142 may comprise information representative of a map or floor plan of the facility 1302 with relative positions of the fixtures 108, location of individual SFTs 104 therein, arrangements of the segments 204, planogram data indicative of how items 1202 are to be arranged at the fixtures 108, and so forth. In some implementations, at least a portion of the physical layout data 142 may be determined using the SFTs 104. For example, the SFTs 104 may be used to detect the devices such as fixtures 108 and ascertain their position within the facility 100.

The analysis module 148 may utilize one or more of the tile output data 132, device data 134, orientation data 144, tracking data 146, sensor data 1530, or other information to generate interaction data 150. The interaction data 150 is indicative of action such as picking or placing an item 1202 for a particular fixture 108, presence of the user 112 at the fixture 108, and so forth.

In some implementations, the analysis module 148 may generate output data 1542 about the user 112. The analysis module 148 may determine if the user 112 is standing, moving, lying on the floor 102, their position with respect to the orientation 118 of a tote 116, and so forth. For example, the analysis module 148 may determine an area of contact with the floor 102 based on the tile output data 132. If the area of contact exceeds a threshold value, the user 112 may be determined to be lying on the floor 102. Based on this determination, other actions may be taken. For example, alarm data may be generated to summon assistance if a user 112 is deemed to be lying on the floor 102.

The analysis module 148, or other modules, may be configured to determine portions of the SFTs 104 which are to be deactivated or from which information is to be disregarded. In one implementation, during setup of the system, the antennas 304 of SFT 104 that are located underneath a fixture 108 may be deactivated. In another implementation, the analysis module 148 may determine SFTs 104 or portions thereof that report presence of an object that is unchanging over long periods of time, such as hours or days. These objects, such as a fixture 108 above the SFT 104, may then be subsequently disregarded and information about these positions may be removed from further processing. If a change is detected, such as when the fixture 108 above the SFT 104 is moved, information about that change may be used to re-enable consideration of data from that SFT 104 or portion thereof.

The tracking module 138 may access information from sensors 306 within the facility 1302, such as those at the shelf 1204 or other fixture 108, onboard the tote 116, carried by or worn by the user 112, and so forth. For example, the tracking module 138 may receive the device data 134 and use the characteristic data 726 to associate a particular user 112 with a pick or place of an item 1202 at the associated fixture 108.

The inventory management module 1524 may determine account item data 1538 that is indicative of one or more items 1202 that are within the custody of a particular user 112, within a particular tote 116, and so forth. For example, the account item data 1538 may comprise a list of the contents of the tote 116. Continuing the example, the list may be further associated with the user account representative of the user 112. In another example, the account item data 1538 may comprise a list of items 1202 that the user 112 is carrying. The tracking module 138 may use the account item data 1538 to determine subsets of possible items 1202 with which the user 112 may have interacted.

The inventory management module 1524, and modules associated therewith, may access sensor data 1530, threshold data 1540, and so forth. The threshold data 1540 may comprise one or more thresholds, ranges, percentages, and so forth, that may be used by the various modules in operation.

The inventory management module 1524 may generate output data 1542. For example, the output data 1542 may include the interaction data 150, inventory levels for individual types of items 1202, overall inventory, and so forth.

The action module 1528 may be configured to initiate or coordinate one or more actions responsive to output data 1542. For example, the action module 1528 may access output data 1542 that indicates a particular fixture 108 is empty and in need of restocking. An action such as a dispatch of a work order or transmitting instructions to a robot may be performed to facilitate restocking of the fixture 108.

Processing of sensor data 1530, such as the image data, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1530. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 1530 or other data. For example, the ANN may be a trained using a supervised learning algorithm such that object identifiers are associated with images of particular objects within training images provided to the ANN. Once trained, the ANN may be provided with the sensor data 1530 and the item data 1536 to allow for a determination of similarity between two or more images.

The sensor data 1530 obtained from different sensors 306 may be used to compare or validate output data 1542. For example, the image data may indicate the presence of a person based on a coat or jacket that is arranged across the back of a chair. However, the tile output data 132 provides information that no user 112 is currently present at that location in the facility 1302. This difference may be used to generate an alarm, notify an associate in the facility 1302, and so forth.

Other data 1544 may be stored in the data store 1520 as well as other modules 1546 in the memory 1516. For example, the other modules 1546 may include a billing module while the other data 1544 may include billing data.

Figure 16:
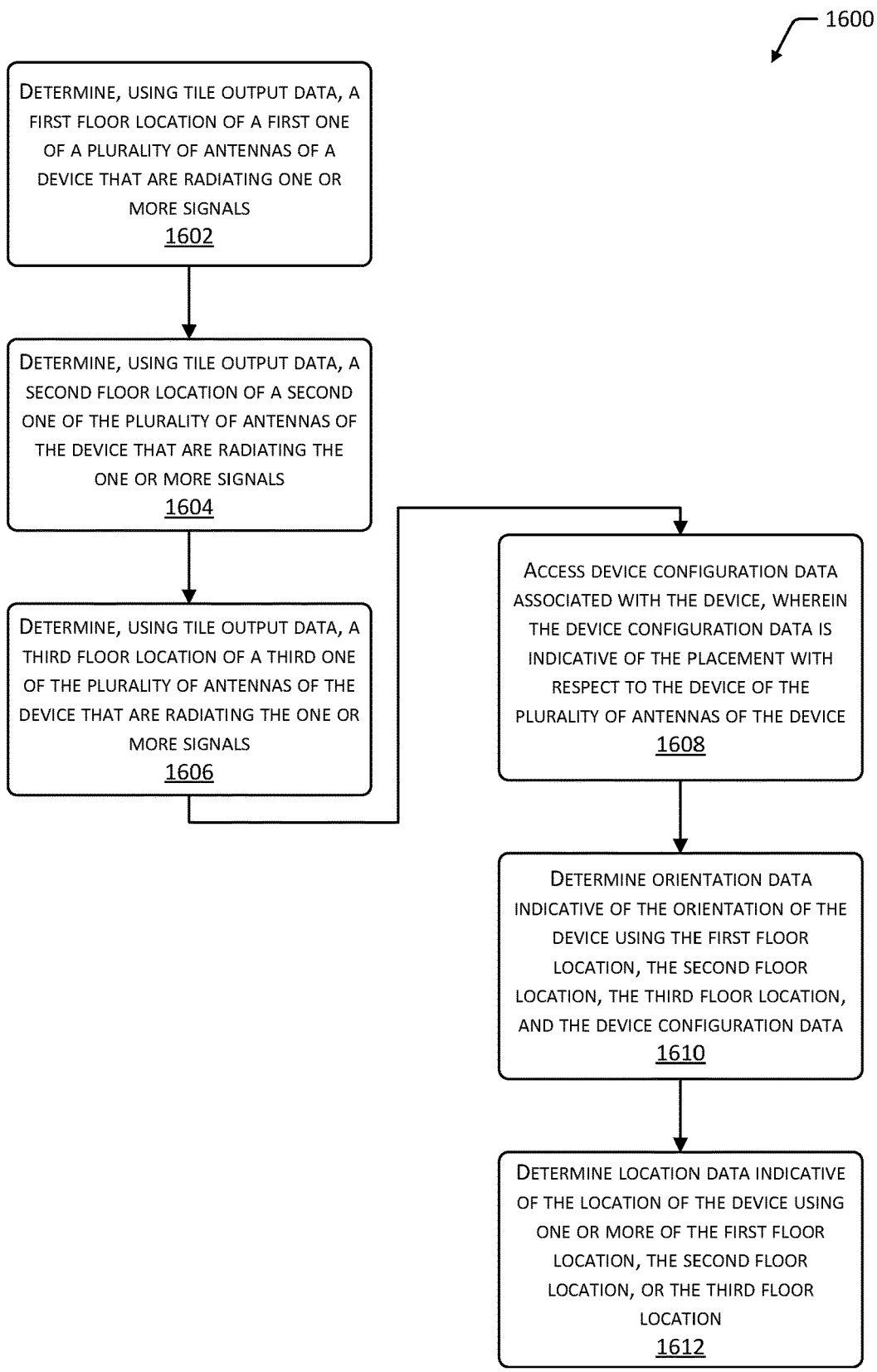
FIG. 16 depicts a flow diagram of a process to determine an orientation of the moveable device having a plurality of antennas, according to some implementations.

FIG. 16 depicts a flow diagram 1600 of a process to determine an orientation of the moveable device 700 that radiates EMS 106 from a plurality of antennas, according to some implementations.

At 1602 a first floor location of a first one of a plurality of antennas 120 of a device 700 is determined. The first floor location is indicative of a particular point or area on the floor 102. The first floor location may be expressed as a particular SFT 104, segment 204, in terms of linear coordinates with respect to predetermined axes, geographic coordinates, and so forth. The first floor location may be determined using information provided in the tile output data 132. For example, the tote 116 may radiate from the antenna 120 an EMS 106 that is then detected by a particular segment 204 of an SFT 104.

At 1604 a second floor location of a second one of the plurality of antennas 120 of a device 700 is determined. The second floor location is indicative of a particular point or area on the floor 102. The second floor location may be expressed as a particular SFT 104, segment 204, in terms of linear coordinates with respect to predetermined axes, geographic coordinates, and so forth. The second floor location may be determined using information provided in the tile output data 132. For example, as described above, the tote 116 may radiate from the antenna 120 an EMS 106 that is then detected by a particular segment 204 of an SFT 104.

At 1606 a third floor location of a third one of the plurality of antennas 120 of a device 700 is determined. The third floor location is indicative of a particular point or area on the floor 102. The third floor location may be expressed as a particular SFT 104, segment 204, in terms of linear coordinates with respect to predetermined axes, geographic coordinates, and so forth. The third floor location may be determined using information provided in the tile output data 132. For example, as described above, the tote 116 may radiate from the antenna 120 an EMS 106 that is then detected by a particular segment 204 of an SFT 104.

At 1608 device configuration data 140 associated with the device 700 is accessed. For example, device identifier data 724 may be received. Based on the device identifier data 724, device configuration data 140 associated with the device 700 may be retrieved. The device configuration data 140 may provide information that is indicative of the placement of the plurality of antennas 120 of the device 700 with respect to the device 700. For example, the device configuration data 140 may indicate an antenna 120 is at a front or back, where with respect to the structure 802 the antenna 120 is located, and so forth.

At 1610 orientation data 144 is determined using the first, second, and third floor locations. For example, these floor locations may be deemed to be indicative of the location of the antennas 120 of the device 700. Given the device configuration data 140 and the locations, the front and back, left and right, or other portions of the device 700 may be determined.

In some implementations, the physical layout data 142 may also be used to determine orientation data 144. For example, the physical layout data 142 may provide data indicative of the position of particular SFTs 104 with respect to one another. The physical layout data 142 may be used to provide a mapping between the orientation 118 with respect to the floor 102 and the orientation 118 with respect to another coordinate system, such as a coordinate system for the entire facility, geographic north, and so forth.

At 1612 location data indicative of the location of the device 700 may be determined using one or more of the first, second, or third floor locations. For example, a tote center 602 may be determined from the first, second, or third floor locations based on the device configuration data 140 and the physical layout data 142. In another example, the location of a particular antenna, such as the first antenna 120 may be deemed to be the location of that device 700. As a result, the location would be the first floor location that corresponds to the location of the first antenna 120.

Figure 17:
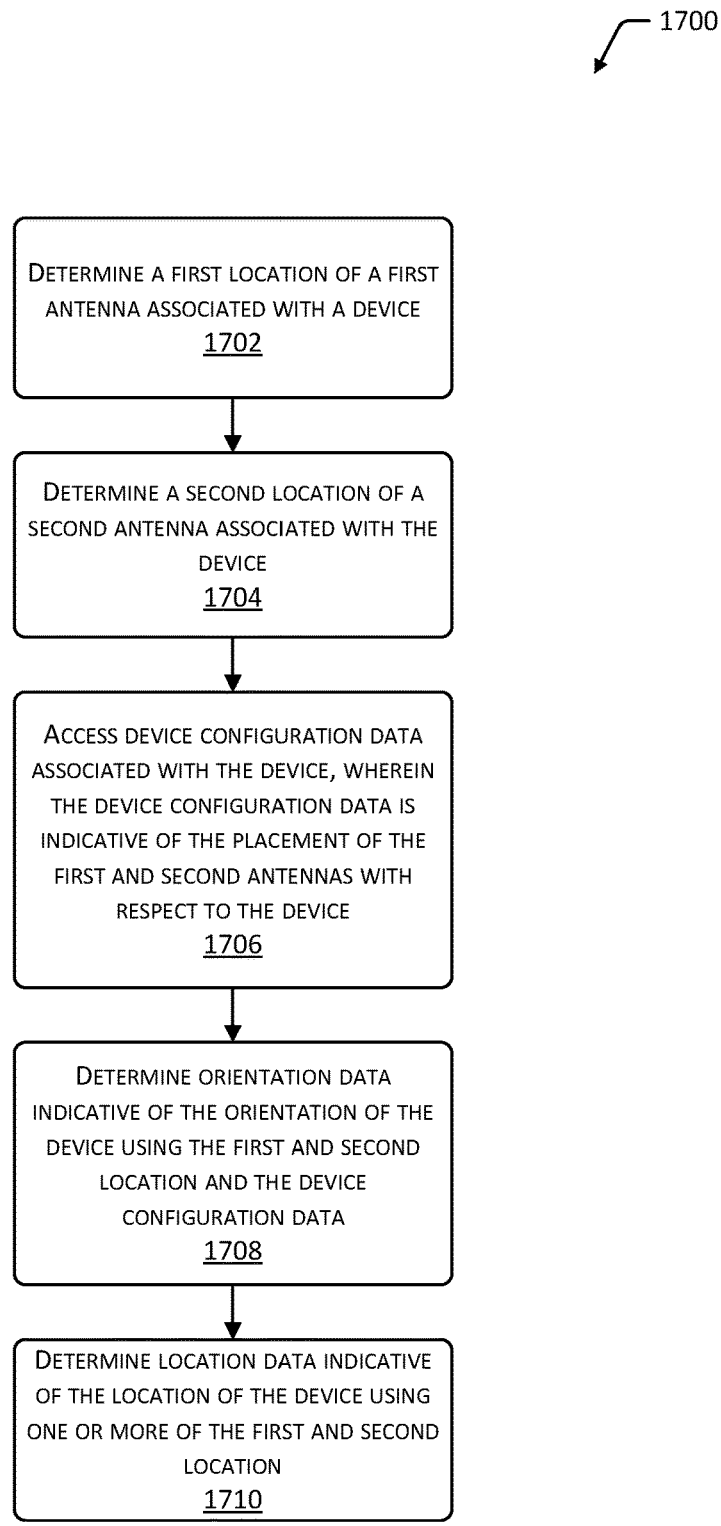
FIG. 17 depicts a flow diagram of a process to determine an orientation of a moveable device having two antennas, according to some implementations.

FIG. 17 depicts a flow diagram 1700 of a process to determine an orientation of a moveable device 700 having two antennas 120, according to some implementations. In one implementation, the antennas 120 may be used to radiate EMS 106 that are then received by the SFT 104. In another implementation, the antennas 120 may be used to receive EMS 106 from the SFT 104.

At 1702 a first location of a first antenna 120(1) associated with a device 700 is determined. For example, the location may be determined using one or more of the tile output data 132 or the device data 134.

At 1704 a second location of a second antenna 120(2) associated with the device 700 is determined. For example, the location may be determined using one or more of the tile output data 132 or the device data 134.

At 1706 device configuration data 140 associated with the device, and indicative of the placement of the first and second antennas with respect to the device, may be accessed. For example, the device identifier 724 may be used to retrieve the device configuration data 140.

At 1708 orientation data 144 indicative of the location of the device 700 is determined using the first location and the second location and the device configuration data 140. For example, given the first location being indicative of the front of the device 700 and the second location being indicative of the back of the device 700, the orientation 118 may be determined as the angle with respect to a reference direction of a line extending from the second location to the first location (back to front).

At 1710 location data indicative of the location of the device 700 may be determined using one or more of the first and second location. For example, if the antennas 120 are located along a midline of the device 700, the location may be determined as a point between the first and second location.

The system described above may be utilized in a variety of different settings including, but not limited to, commercial, non-commercial, medical, and so forth. For example, the SFTs 104 may be deployed in a home, hospital, care facility, correctional facility, transportation facility, office, and so forth. The tracking module 138 may provide orientation data 144, tracking data 146, and so forth of users 112 within a facility. In some implementations, the tracking module 146 may provide tracking data 146 that is indicative of the identity of a particular user 112. The analysis module 148 may be used to generate output data 1542 that is indicative of a status of the user 112, such as whether the user 112 is standing, sitting, lying on the floor, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
  a tote comprising:
    a plurality of wheels;
    a structure supported by the plurality of wheels;
    a power supply supported by the structure;
    a transmitter supported by the structure and powered by the power supply, the transmitter configured to generate a signal that encodes one or more of: a device identifier indicative of the tote, data indicative of a type of the tote, or data indicative of a user associated with the tote;
    a first antenna mounted proximate to a front of the structure and proximate to a bottom of the structure, wherein the first antenna is connected to the transmitter and configured to radiate the signal;
    a second antenna mounted proximate to a first corner at a back of the structure and proximate to the bottom of the structure, wherein the second antenna is connected to the transmitter and configured to radiate the signal; and
a third antenna mounted proximate to a second corner at the back of the structure and proximate to the bottom of the structure, wherein the third antenna is connected to the transmitter and configured to radiate the signal.

2. The system of claim 1, further comprising:
a floor comprising:
a flooring material;
a support structure configured to support the flooring material;
at least one receiver to detect the signal;
a fourth antenna to receive the signal, wherein the fourth antenna is at a first floor location and is coupled to the at least one receiver;
a fifth antenna to receive the signal, wherein the fifth antenna is at a second floor location and is coupled to the at least one receiver;
a sixth antenna to receive the signal, wherein the sixth antenna is at a third floor location and is coupled to the at least one receiver;
a first communication interface;
a first memory, storing first computer-executable instructions; and
a first hardware processor to execute the first computer-executable instructions to:
determine the signal is received using the fourth antenna;
determine the signal is received using the fifth antenna;
determine the signal is received using the sixth antenna;
generate tile output data indicative of the reception of the signal at the first floor location, the second floor location, and the third floor location; and
send the tile output data using the first communication interface.

3. The system of claim 2, further comprising:
a computing device comprising:
a second communication interface;
a second memory, storing second computer-executable instructions; and
a second hardware processor to execute the second computer-executable instructions to:
receive the tile output data;
access device configuration data indicative of an arrangement of the first antenna, the second antenna, and the third antenna with respect to one another as mounted to the structure of the tote and an orientation of the tote with respect to the first antenna, the second antenna, and the third antenna;
access physical layout data indicative of an arrangement of the fourth antenna, the fifth antenna, and the sixth antenna with respect to one another within the floor;
determine an arrangement indicated by the tile output data corresponds to the device configuration data; and
determine the orientation of the tote based on the determination that the arrangement indicated by the tile output data corresponds to the device configuration data and based on the orientation of the tote with respect to the first antenna, the second antenna, and the third antenna as indicated by the device configuration data.

4. A system comprising:
a tote comprising:
a plurality of wheels;
a structure supported by the plurality of wheels;
a power supply supported by the structure;
an item stowage area supported by the structure;
at least one transmitter supported by the structure, the at least one transmitter configured to generate one or more signals; and
at least three antennas coupled to the at least one transmitter and configured to radiate the one or more signals, wherein:
the at least three antennas are mounted to the structure; and
the at least three antennas are arranged to produce an asymmetrical pattern within a plane that is parallel to a floor.

5. The system of claim 4, wherein:
a first antenna of the at least three antennas is mounted proximate to a front of the structure and proximate to a bottom of the structure, wherein the first antenna is connected to the at least one transmitter and configured to radiate a first signal;
a second antenna mounted proximate to a first corner at a back of the structure and proximate to the bottom of the structure, wherein the second antenna is connected to the at least one transmitter and configured to radiate a second signal; and
a third antenna mounted proximate to a second corner at the back of the structure and proximate to the bottom of the structure, wherein the third antenna is connected to the at least one transmitter and configured to radiate a third signal.

6. The system of claim 4, further comprising:
a floor tile comprising one or more floor antennas connected to one or more receivers.

7. The system of claim 4, wherein the at least one transmitter is configured to:
couple to a first antenna of the at least three antennas during a first time and radiate a first signal;
couple to a second antenna of the at least three antennas during a second time and radiate a second signal; and
couple to a third antenna of the at least three antennas during a third time and radiate a third signal.

8. The system of claim 4, wherein the at least one transmitter is configured to encode data in the one or more signals, and further wherein the data is indicative of one or more of:
an identifier associated with the tote,
a type of the tote, or
a corresponding antenna used to radiate a corresponding signal.

9. The system of claim 4, the tote further comprising:
a bidirectional communication interface;
a first memory, storing first computer-executable instructions; and
a first hardware processor to execute the first computer-executable instructions to:
send, using the bidirectional communication interface, data that is indicative of one or more of:
an identifier associated with the tote,
a type of the tote, or
a corresponding antenna used to radiate a particular one of the one or more signals.

10. The system of claim 4, wherein:
the at least three antennas are mounted to the structure, and a distance between edges of any two antennas of the at least three antennas is greater than a width of an antenna in a floor tile.

11. The system of claim 4, wherein:
the at least three antennas are mounted to the structure, and edges of the at least three antennas are maintained at a distance of at least two millimeters from an outermost edge of the structure.

12. A system comprising:
a device comprising:
   a structure;
   an item stowage area supported by the structure;
   one or more transmitters configured to generate a first signal and a second signal;
   a first antenna mounted at a first position on the structure, wherein the first antenna is connected to at least one of the one or more transmitters and is configured to radiate the first signal; and
   a second antenna mounted at a second position on the structure, wherein the second antenna is connected to at least one of the one or more transmitters and is configured to radiate the second signal; and
a floor comprising:
   a plurality of floor antennas, wherein each floor antenna is arranged at a particular respective location with respect to other floor antennas in the plurality of floor antennas;
   one or more receivers configured to detect signals obtained by one or more of the plurality of floor antennas;
   a first communication interface;
   a first memory, storing first computer-executable instructions; and
   a first hardware processor to execute the first computer-executable instructions to:
      determine the first signal is received by at least one of the plurality of floor antennas that are located at a first floor location;
      determine the second signal is received by at least one of the plurality of floor antennas that are located at a second floor location;
      generate output data indicative of the reception of the first signal at the first floor location and reception of the second signal at the second floor location; and
      send the output data using the first communication interface.

13. The system of claim 12, wherein one or more of the first signal or the second signal encode data indicative of one or more of:
   a device identifier indicative of the device,
   a type of the device, or
   a user associated with the device; and
   further wherein the output data is indicative of the data that is encoded.

14. The system of claim 12, wherein the first signal encodes data indicative of a relative placement of the first antenna with respect to the structure.

15. The system of claim 14, wherein the second signal encodes data indicative of a relative placement of the second antenna with respect to the structure, and further wherein the data indicative of the relative placement is indicative of a front, back, left, or right of the structure.

16. The system of claim 12, further comprising:
a computing device comprising:
   a second communication interface;
   a second memory, storing second computer-executable instructions; and
   a second hardware processor to execute the second computer-executable instructions to:
      receive the output data;
      determine the first signal is associated with the first position on the structure;
      determine the second signal is associated with the second position on the structure; and
      determine orientation data indicative of orientation of the device based at least in part on:
         the first floor location;
         the second floor location; and
         data indicative of the orientation of the device with respect to one or more of the first position on the structure or the second position on the structure.

17. The system of claim 12, further comprising:
a computing device comprising:
   a second communication interface;
   a second memory, storing second computer-executable instructions; and
   a second hardware processor to execute the second computer-executable instructions to:
      receive the output data;
      retrieve data indicative of the first signal being associated with a back of the device;
      retrieve data indicative of the second signal being associated with a front of the device; and
      determine the device is oriented along a line extending from the first floor location through the second floor location.

18. A system comprising:
a device comprising:
   a structure;
   an item stowage area supported by the structure;
   one or more receivers to detect a first signal and a second signal radiated by a floor;
   a first antenna mounted at a first position on the structure, wherein the first antenna is connected to at least one of the one or more receivers and receives the first signal;
   a second antenna mounted at a second position on the structure, wherein the second antenna is connected to at least one of the one or more receivers and receives the second signal;
   a first bidirectional communication interface;
   a first memory, storing first computer-executable instructions; and
   a first hardware processor to execute the first computer-executable instructions to:
      generate device data indicative of:
         a device identifier indicative of one or more of the device or of a type of the device;
         reception of the first signal using the first antenna;
         reception of the second signal using the second antenna; and
      send the device data using the first bidirectional communication interface.

19. The system of claim 18, further comprising:
a computing device comprising:
   a second communication interface;
   a second memory, storing second computer-executable instructions; and a second hardware processor to execute the second computer-executable instructions to:
  receive the device data;
  determine based on the device identifier, device configuration data indicative of the first position on the structure of the first antenna and the second position on the structure of the second antenna;
  determine a first floor location indicative of a location of a third antenna used to radiate the first signal;
  determine a second floor location indicative of a location of a fourth antenna used to radiate the second signal; and
  determine orientation data indicative of an orientation of the device with respect to the floor based on the first floor location, the second floor location, and the device configuration data.

20. The system of claim 18, the first memory further storing second computer-executable instructions; and the first hardware processor to further execute the second computer-executable instructions to:
  access physical layout data indicative of a relative physical arrangement of a third antenna at a floor that emits the first signal and a fourth antenna at the floor that emits the second signal;
  access device configuration data indicative of a relative arrangement of the first position on the structure and the second position on the structure; and
  determine orientation data indicative of an orientation of the device with respect to the floor based on the relative arrangement of the first position on the structure proximate to the third antenna and the second position on the structure proximate to the fourth antenna.

* * * * *

UNITED STATES PATENT AND TRADEMARK OFFICE
CERTIFICATE OF CORRECTION

PATENT NO.          : 10,969,461 B1
APPLICATION NO.     : 15/614223
DATED               : April 6, 2021
INVENTOR(S)         : Nathan Pius O'Neill et al.

Page 1 of 1

It is certified that error appears in the above-identified patent and that said Letters Patent is hereby corrected as shown below:

On the Title Page

Under item "(57) ABSTRACT", Line 4:
Currently reads "one or more of a transmitters to generate EMS"
Where it should read --one or more transmitters to generate EMS--.

In the Claims

Column 51, Claim 12, Line 20:
Currently reads "least one of the one or more transmitters and is"
Where it should read --least a first one of the one or more transmitters and is--.

Column 51, Claim 12, Line 24:
Currently reads "at least one of the one or more transmitters and is"
Where it should read --at least a second one of the one or more transmitters and is--.

Column 52, Claim 18, Line 44:
Currently reads "least one of the one or more transmitters and is"
Where it should read --least a first one of the one or more receivers and is--.

Column 52, Claim 18, Line 48:
Currently reads "at least one of the one or more transmitters and is"
Where it should read --at least a second one of the one or more receivers and is--.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*